United States Patent
Pechanek et al.

(10) Patent No.: US 6,405,185 B1
(45) Date of Patent: Jun. 11, 2002

(54) MASSIVELY PARALLEL ARRAY PROCESSOR

(75) Inventors: Gerald George Pechanek, Endwell; Stamatis Vassiliadis, Vestal; Jose Guadalupe Delgado-Frias, Endwell, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/551,144

(22) Filed: Mar. 23, 1995

Related U.S. Application Data

(63) Continuation of application No. 07/864,112, filed on Apr. 6, 1992, now abandoned.

(51) Int. Cl.$^7$ .......................... G06F 15/18; G06F 15/00
(52) U.S. Cl. ............................. 706/41; 706/14; 706/42; 712/19
(58) Field of Search ............................. 706/41, 14, 42; 712/19

(56) References Cited

U.S. PATENT DOCUMENTS

| | | | | |
|---|---|---|---|---|
| 4,270,170 A | | 5/1981 | Reddaway ................... | 712/11 |
| 4,972,361 A | | 11/1990 | Rader ......................... | 708/522 |
| 5,018,065 A | * | 5/1991 | McWhirter et al. ........... | 712/19 |
| 5,138,695 A | * | 8/1992 | Means et al. ................. | 706/41 |
| 5,148,515 A | * | 9/1992 | Vassiliadis et al. ........... | 706/41 |
| 5,274,832 A | * | 12/1993 | Khan ......................... | 708/424 |
| 5,297,289 A | * | 3/1994 | Mintzer ....................... | 712/19 |
| 5,509,106 A | * | 4/1996 | Pechanek et al. ............. | 706/41 |

FOREIGN PATENT DOCUMENTS

| | | |
|---|---|---|
| EP | 456201 A | 11/1991 |
| GB | 2219106 | 11/1989 |

OTHER PUBLICATIONS

IEEE, 1988, "Mapping Signal Processing Algorithm To Fixed Architectures", V2. 10, pp. 2037–2040, by Stewart.

(List continued on next page.)

*Primary Examiner*—George B. Davis
(74) *Attorney, Agent, or Firm*—John E. Hoel, Esq.; Morgan & Finnegan, LLP; Scott W. Reid, Esq.

(57) ABSTRACT

Image processing for multimedia workstations is a computationally intensive task requiring special purpose hardware to meet the high speed requirements associated with the task. One type of specialized hardware that meets the computation high speed requirements is the mesh connected computer. Such a computer becomes a massively parallel machine when an array of computers interconnected by a network are replicated in a machine. The nearest neighbor mesh computer consists of an N×N square array of Processor Elements(PEs) where each PE is connected to the North, South, East and West PEs only. The diagonal folded mesh array processor, which is called Oracle, allows the matrix transformation operation to be accomplished in one cycle by simple interchange of the data elements in the dual symmetric processor elements. The use of Oracle for a parallel 2-D convolution mechanish for image processing and multimedia applications and for a finite difference method of solving differential equations is presented, concentrating on the computational aspects of the algorithm.

4 Claims, 22 Drawing Sheets

OTHER PUBLICATIONS

Ward et al, "The application and development of wavefront array processors for advanced front–end signal processing systems"; Papers presented at the first international workshop on systolic arrays, oxford, p. 295–301, Jul. 2–4, 1986.*

Cappello, Peter "A Processor–Time–Minimal Systolic Array for Cubical Mesh Algorithms", IEEE Transactions on Parallel and Distributed Systems, Jan. 1992.*

IBM Technical Disclosure Bulletin, vol. 34, No. 10A, 3/92, pp.100–106, "Many–Snap".

Computer Architecture News, vol. 20, No.2, 05/92, NY US; C. Glass & L. Ni; "The Turn Model for Adaptive Routing".

Signal Processing IV; Theories & Applications Proceedings of Eusipco–88 vol. 1, 9/88, Grenoble France; pp. 347–350, S. Kung & R. Stewart "A Triangular Array Processor for Kalman Filtering".

IEEE International Conf. on Computer Design: VLSI in Computers, 10/86 pp. 269–274, D. Koppelman et al; "The implementation of a triangular permutation network using wafer scale integration".

* cited by examiner

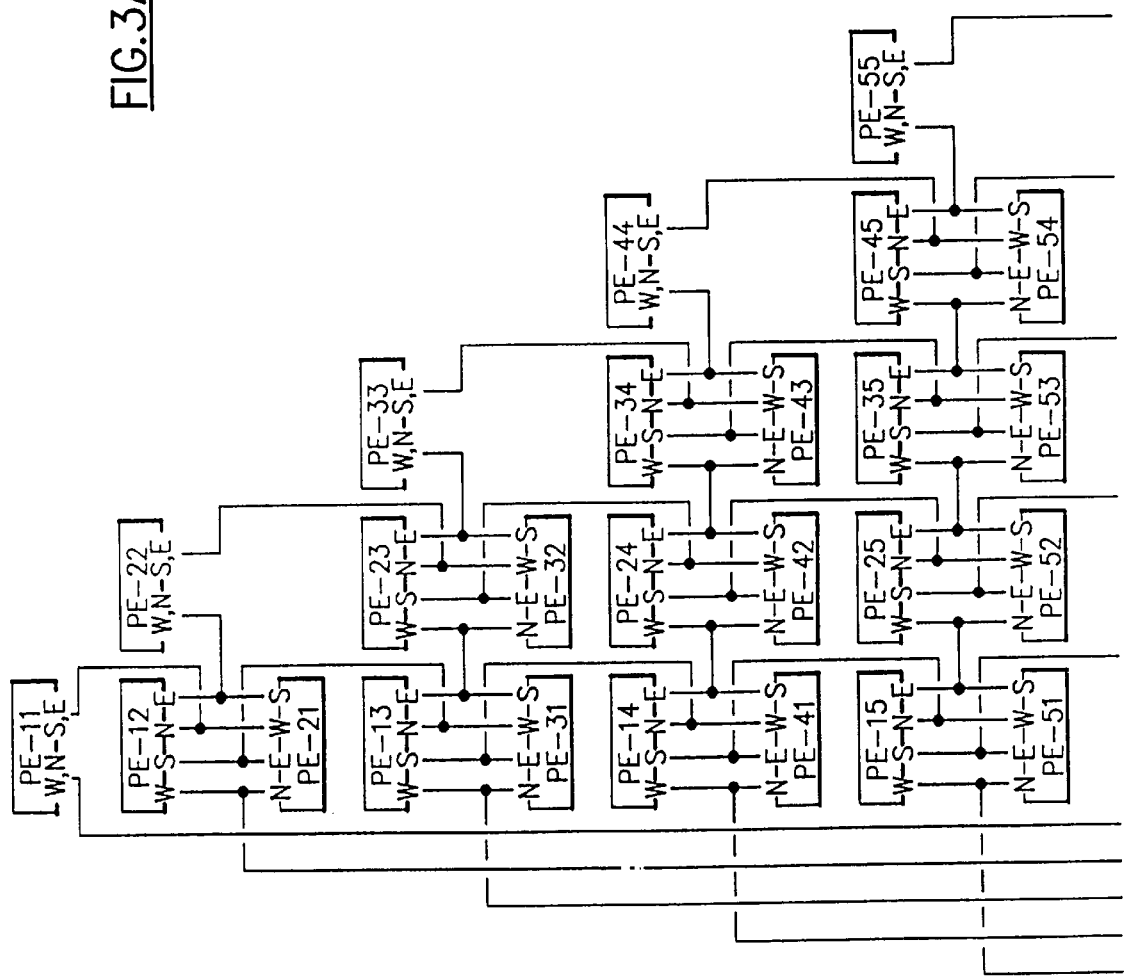

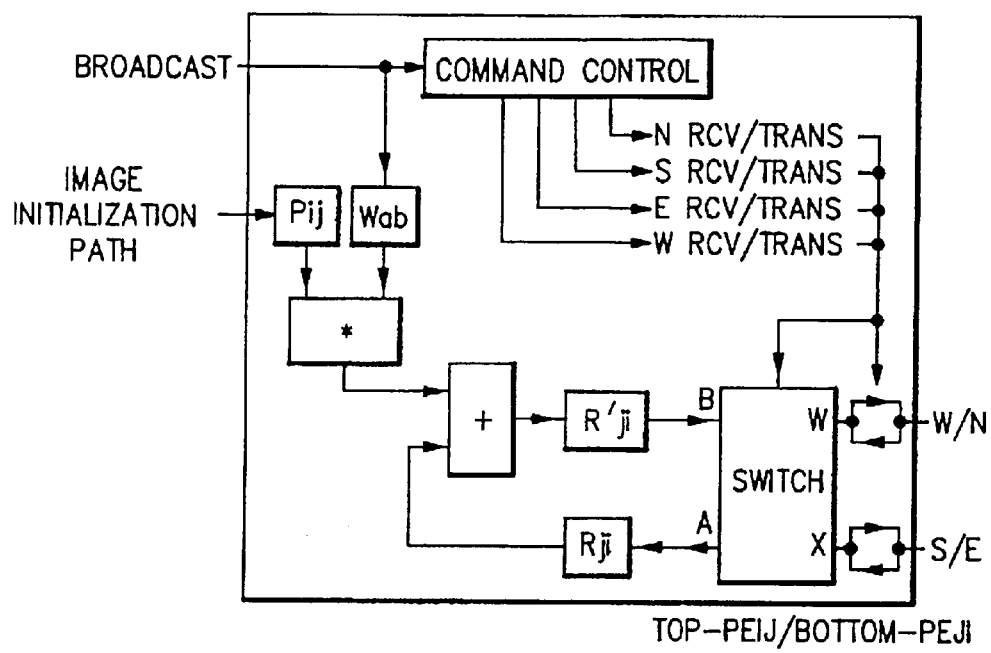
FIG.4F
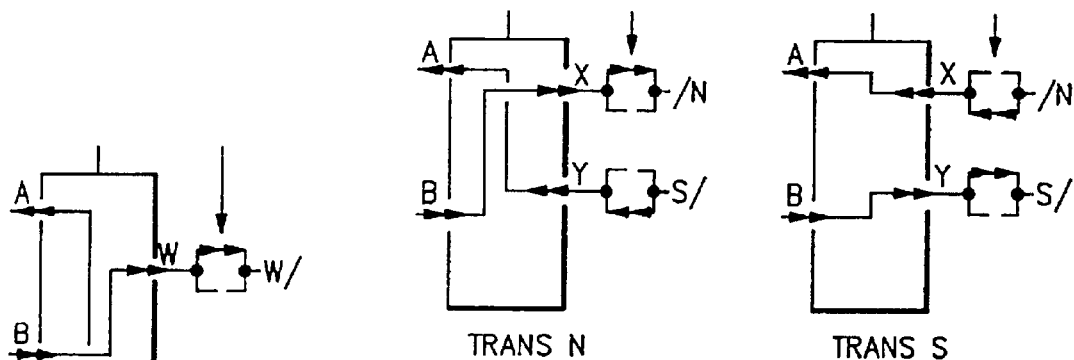
FIG.4E · FIG.4G · FIG.4H
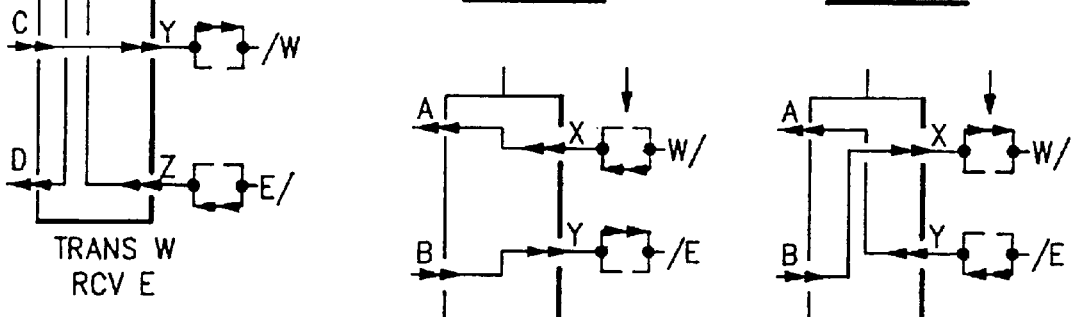
FIG.4I · FIG.4J

```
1  1  1  1  1  1  1  1
2  2  2  2  2  2  2  2
3  3  3  3  3  3  3  3
4  4  4  4  4  4  4  4
5  5  5  5  5  5  5  5
6  6  6  6  6  6  6  6
7  7  7  7  7  7  7  7
8  8  8  8  8  8  8  8
```
FIG. 7A
```
1
2  2
1
3  3  3
1  2
4  4  4  4
1  2  3
5  5  5  5  5
1  2  3  4
6  6  6  6  6  6
1  2  3  4  5
7  7  7  7  7  7  7
1  2  3  4  5  6
8  8  8  8  8  8  8  8
1  2  3  4  5  6  7
```
FIG. 7B
```
W13    W23    W33
W12    W22    W32
W11    W21    W31
```
FIG. 8
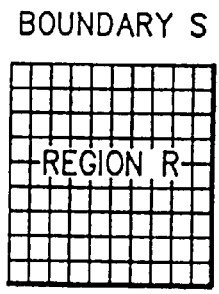
FIG. 13A
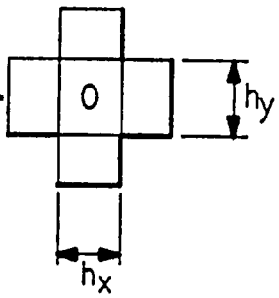
FIG. 13B

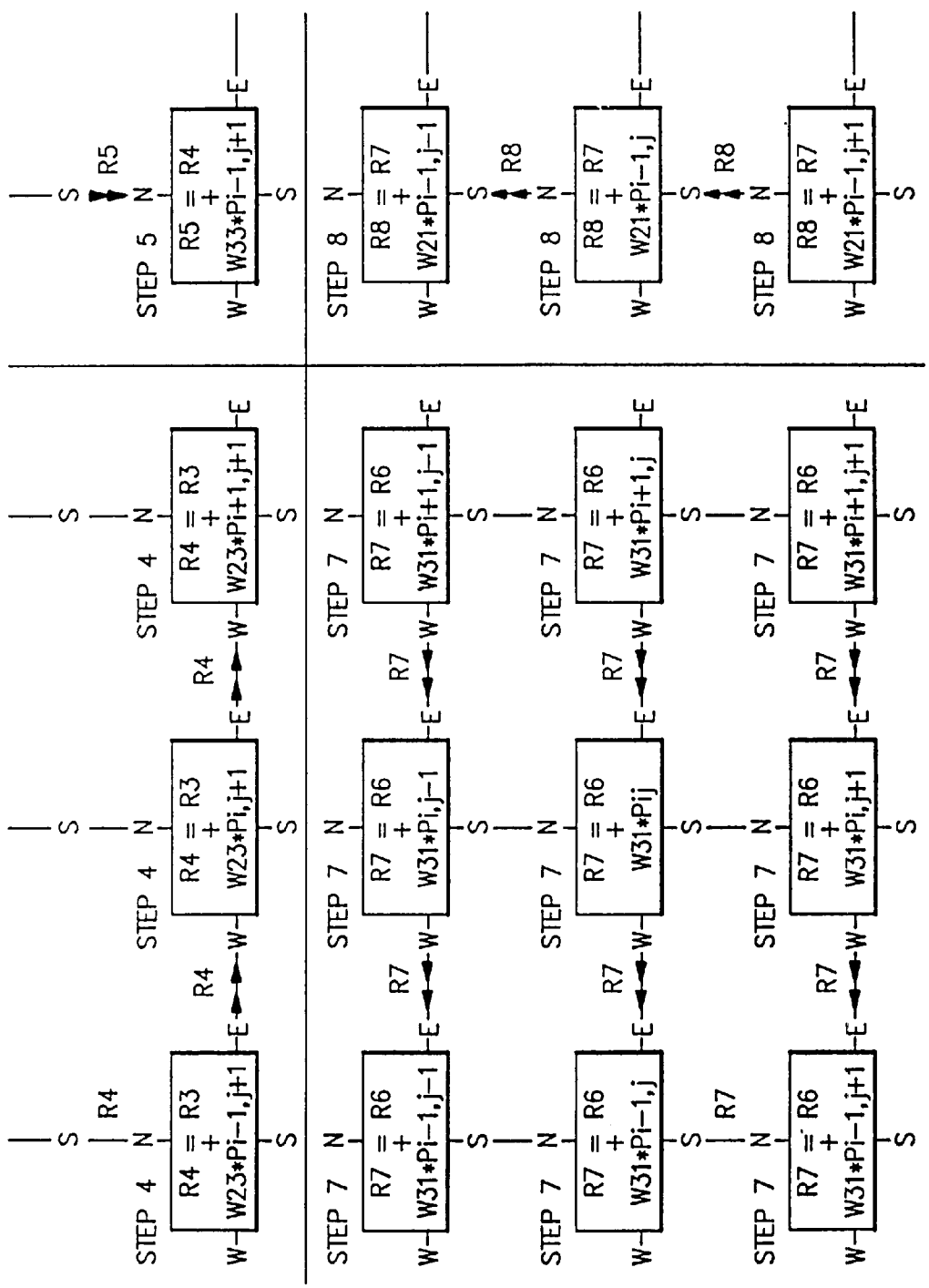

STEP 2

TRANS N
RCV S

STEP 4

TRANS E
RCV W

STEP 6

TRANS S
RCV N

STEP 8

TRANS N
RCV S

STEP 5

DIVIDE BY 4 AND COMPARE

NO TRANSMISSIONS

MASSIVELY PARALLEL ARRAY PROCESSOR

This application is a continuation of application Ser. No. 07/864,112 filed Apr. 6, 1992, now abandoned.

FIELD OF THE INVENTION

The invention relates to computers and particularly to parallel array processors.

CROSS REFERENCE TO RELATED APPLICATIONS

The present U.S. patent application claims priority as a continuation-in-part application and is related to the following applications:

U.S. Ser. No. 07/526,866 filed May 22, 1990, of S. Vassiliadis et al, entitled: Orthogonal Row-Column Neural Processor (now U.S. Pat. No. 5,065,339, issued Nov. 12, 1991); and U.S. Ser. No. 07/740,355 filed Aug. 5, 1991, of S. Vassiliadis et al, entitled: Scalable Nerual Array Processor, issued as U.S. Pat. No. 5,146,543; and, U.S. Ser. No. 07/740,556 filed Aug. 5, 1991, of S. Vassiliadis et al, entitled: Adder Tree for a Neural Array Processor, issued as U.S. Pat. No. 5,146,420 and, U.S. Ser. No. 07/740,568 filed Aug. 5, 1991, of S. Vassiliadis et al, entitled: Apparatus and Method for Neural Processor, abandoned in favor of U.S. Ser. No. 08/000,915, filed Jan. 6, 1993, issued as U.S. Pat. No. 5,251,287 and, U.S. Ser. No. 07/740,266 filed Aug. 5, 1991, of S. Vassiliadis et al, entitled: Scalable Neural Array Processor and Method, issued as U.S. Pat. No. 5,148,515 and U.S. Ser. No. 07/682,786 filed Apr. 8, 1991, of G. G. Pechanek et al, entitled: Triangular Scalable Neural Array Processor, abandoned in favor of continuation application U.S. Ser. NO. 08/231,853, filed Apr. 22, 1994, (now co-pending).

These applications and the present continuation-in-part application are owned by one and the same assignee, namely, International Business Machines Corporation of Armonk, N.Y.

The descriptions set forth in these above applications are hereby incorporated into the present application.

GLOSSARY OF TERMS

ALU

ALU is the arithmetic logic unit portion of a processor.

Array

Array refers to an arrangement of elements in one or more dimensions.

Array processors are computers which have many functional units or PEs arranged and interconnected to process in an array. Massively parallel machines use array processors for parallel processing of data arrays by array processing elements or array elements. An array can include an ordered set of data items (array element) which in languages like Fortran are identified by a single name, and in other languages such a name of an ordered set of data items refers to an ordered collection or set of data elements, all of which have identical attributes. An program array has dimensions specified, generally by a number or dimension attribute. The declarator of the array may also specify the size of each dimension of the array in some languages. In some languages, an array is an arrangement of elements in a table. In a hardware sense, an array is a collection of structures (functional elements) which are generally identical in a massively parallel architecture. Array elements in data parallel computing are elements which can be assigned operations, and when parallel can each independently and in parallel execute the operations required. Generally arrays may be thought of as grids of processing elements. Sections of the array may be assigned sectional data, so that sectional data can be moved around in a regular grid pattern. However, data can be indexed or assigned to an arbitrary location in an array.

Functional unit

A functional unit is an entity of hardware, software, or both, capable of accomplishing a purpose.

MIMD

A processor array architecture wherein each processor in the array has its own instruction stream, thus Multiple Instruction stream, to execute Multiple Data streams located one per processing element.

Module

A module is a program unit that is discrete and identifiable, or a functional unit of hardware designed for use with other components.

PE

PE is used for processing element. We use the term PE to refer to a single processor, which has interconnected allocated memory and I/O capable system element or unit that forms one of our parallel array processing elements. As the result of wiring, in our system, symmetric replicatable elements, are wired together for sharing interconnection paths.

SIMD

A processor array architecture wherein all processors in the array are commanded from a Single Instruction stream, to execute Multiple Data streams located one per processing element.

REFERENCES USED IN THE DISCUSSION OF THE INVENTION

During the detailed description which follows the following works will be referenced as an aid for the reader. These additional references are:

1. R. J. Gove, W. Lee, Y. Kim, and T. Alexander, "Image Computing Requirements for the 1990s: from Multimedia to Medicine," *Proceedings of the SPIE Vol. 1444—Image Capture, Formatting, and Display*, pp. 318–333, 1991.
2. R. Cypher and J. L. C. Sanz, "SIMD Architectures and Algorithms for Image Processing and Computer Vision," *IEEE Transactions on Acoustics, Speech, and Signal Processing*, Vol. 37, No. 12, pp. 2158–2174, December 1989.
3. K. E. Batcher, "Design of a Massively Parallel Processor," *IEEE Transactions on Computers* Vol. C-29, No. 9, pp. 836–840, September 1980.
4. L. Uhr, *Multi-Computer Architectures for Artificial Intelligence*, New York, N.Y.: John Wiley & Sons, chap. 8, p.97, 1987.
5. S.-Y. Lee and J. K. Aggarwal, "Parallel 2-D Convolution on a Mesh Connected Array Processor," *IEEE Transactions on Pattern Analysis and Machine Intelligence*, Vol. PAMI-9, No. 4, pp. 590–594, July 1987.
6. E. B. Eichelberger and T. W. Williams, "A Logic Design Structure for Testability," *Proc. 14th Design Automation Conference*, IEEE, 1977.
7. D. M. Young and D. R. Kincaid, "A Tutorial on Finite Difference Methods and Ordering of Mesh Points,"

Proceedings of the Fall Joint Computer Conference, pp. 556–559, Dallas, Tex.: IEEE Press, November 1986.

8. E. Kreyszig, *Advanced Engineering Mathematics*. New York, N.Y.: John Wiley & Sons, chap. 9.7, pp. 510–512, 1968.

9. U.S. Ser. No. 07/799,602, filed Nov. 27, 1991, by H. Olnowich, entitled: "Multi-Media Serial Line Switching Adapter for Parallel Networks and Heterogenous and Homologous Computer Systems". systems which allow dynamic switching between MIMD, SIMD, and SISD.

10. U.S. Ser. No. 07/798,788, filed Nov. 27, 1991, by P. M. Kogge, entitled: "Dynamic Multi-mode Parallel Processor Array Architecture".

These additional references are incorporated by reference.

BACKGROUND OF THE INVENTION

As background for our invention, the processing of visual information can be considered to consist of three different processing domains: image processing, pattern recognition, and computer graphics. The merger of image processing, pattern recognition and computer graphics is referred to as image computing and represents a capability required by the multimedia workstations of the future. "Multimedia refers to a technique that presents information in more than one way, such as via images, graphics, video, audio, and text, in order to enhance the comprehensibility of the information and to improve human-computer interaction" (See Additional Reference 1).

In the never ending quest for faster computers, engineers are linking hundreds, and even thousands of low cost microprocessors together in parallel to create super supercomputers that divide in order to conquer complex problems that stump today's machines. Such machines are called massively parallel. Multiple computers operating in parallel have existed for decades.

Early parallel machines included the ILLIAC which was started in the 1960s. Other multiple processors include (see a partial summary in U.S. Pat. No. 4,975,834 issued Dec. 4, 1990 to Xu et al) the Cedar, Sigma-1, the Butterfly and the Monarch, the Intel ipsc, The Connection Machines, the Caltech COSMIC, the N Cube, IBM's RP3, IBM's GF11, the NYU Ultra Computer, the Intel Delta and Touchstone.

Large multiple processors beginning with ILLIAC have been considered supercomputers. Supercomputers with greatest commercial success have been based upon multiple vector processors, represented by the Cray Research Y-MP systems, the IBM 3090, and other manufacturer's machines including those of Amdahl, Hitachi, Fujitsu, and NEC.

Massively Parallel Processors (MPPs) are now thought of as capable of becoming supercomputers. These computer systems aggregate a large number of microprocessors with an interconnection network and program them to operate in parallel. There have been two modes of operation of these computers. Some of these machines have been MIMD mode machines. Some of these machines have been SIMD mode machines. Perhaps the most commercially acclaimed of these machines has been the Connection Machines series 1 and 2 of Thinking Machines, Inc. These have been essentially SIMD machines. Many of the massively parallel machines have used microprocessors interconnected in parallel to obtain their concurrency or parallel operations capability. Intel microprocessors like i860 have been used by Intel and others. N Cube has made such machines with Intel '386 microprocessors. Other machines have been built with what is called the "transputer" chip. Inmos Transputer IMS T800 is an example. The Inmos Transputer T800 is a 32 bit device with an integral high speed floating point processor.

As an example of the kind of systems that are built, several Inmos Transputer T800 chips each would have 32 communication link inputs and 32 link outputs. Each chip would have a single processor, a small amount of memory, and communication links to the local memory and to an external interface. In addition, in order to build up the system communication link adaptors like IMS C011 and C012 would be connected. In addition switches, like a IMS C004 would be provided to provide, say, a crossbar switch between the 32 link inputs and 32 link outputs to provide point to point connection between additional transputer chips. In addition, there will be special circuitry and interface chips for transputers adapting them to be used for a special purpose tailored to the requirements of a specific device, a graphics or disk controller. The Inmos IMS M212 is a 16 bit process, with on chip memory and communication links. It contains hardware and logic to control disk drives and can be used as a programmable disk controller or as a general purpose interface. In order to use the concurrency (parallel operations) Inmos developed a special language, Occam, for the transputer. Programmers have to describe the network of transputers directly in an Occam program.

Some of these massively parallel machines use parallel processor arrays of processor chips which are interconnected with different topologies. The transputer provides a crossbar network with the addition of IMS C004 chips. Some other systems use a hypercube connection. Others use a bus or mesh to connect the microprocessors and there associated circuitry. Some have been interconnected by circuit switch processors that use switches as processor addressable networks. Generally, as with the 14 RISC/6000s which were interconected last fall at Lawarence Livermore by wiring the machines together, the processor addressable networks have been considered as coarse-grained multiprocessors.

Some very large machines are being built by Intel and nCube and others to attack what are called "grand challenges" in data processing. However, these computers are very expensive. Recent projected costs are in the order of $30,000,000.00 to $75,000,000.00 (Tera Computer) for computers whose development has been funded by the U.S. Government to attack the "grand challenges". These "grand challenges" would include such problems as climate modeling, fluid turbulence, pollution dispersion, mapping of the human genome and ocean circulation, quantum chromodynamics, semiconductor and supercomputer modeling, combustion systems, vision and cognition.

Problems Addressed by our Oracle Machine

It is a problem for massively parallel array processors to attack adequately the image computing problems which exist. One particular algorithm used in image processing is convolution, which replaces each image pixel value with a weighted sum of the pixels in a defined surrounding area or window of pixels. A M×M square convolution window consists of a set of M×M weights, each corresponding to the associated pixels located in the window (Additional Reference 2). For an N by N array of pixels, the convolution algorithm requires $M^2N^2$ multiplication operations. Assuming an N of 1024 and a M of 3 a single image frame convolution would take 9 million multiplications and sum of product calculations per convolution and if the processing is on video data occurring at a rate of 30 frames per second then 270 million multiplications sum of product calculations per second would be required. For a uniprocessor to process this data, where each convolution window weight value must be fetched separately, with the multiply and add treated as separate operations, and followed by a write of the weighted average pixel result, the convolution would consist of 27 separate operations per pixel (9 reads, 9 multiplies, 8 adds, and 1 write) resulting in 27 million×30 operations per second or 810 million operations per second (Additional Reference 1). Due to the high computational load, special purpose processors have been proposed to off load the image processing task from the system processor and to provide the adequate through put required for image computing. One of these special purpose processors is the nearest neighbor mesh connected computer (See Additonal References 2, 3, and 4-pp. 97) where multiple Processor Elements (PEs) are connected to their north, south, east west neighbor PEs and all PEs are operated in a synchronous Single Instruction Multiple Data (SIMD) fashion. It is assumed that a PE can communicate with any of its neighboring PEs but only one neighbor PE at a time. For example, each PE can communicate to their east neighbor PE, in one communication cycle. It is also assumed that a broadcast mechanism is present such that data and instructions can be communicated simultaneously to all PEs in one broadcast communication period. Bit serial interfaces are typical, as they were present in the Thinking Machines CM-1 family.

As is thus recognized, what is needed is a PE which can improve image computing, improve speed, and be adaptable to be replicated as part of a parallel array processor in a massively parallel environment. There is a need to improve the system apparatus for use in solving differential equations. We think a new kind of PE is needed for this problem. Creation of a new PE and massively parallel computing system apparatus built with new thought will improve the complex processes which need to be handled in the multimedia image computer field, and still be able to process general purpose applications.

SUMMARY OF THE INVENTION

The improvements which we have made result in a new machine apparatus. We call the machine which implements our invention the Oracle machine and we will describe it below. Our present invention relates to the apparatus which enables making a massively parallel computing system. We present a a new PE and related organizations of computer systems which can be employed in a parallel array computer system or massively parallel array processor.

We provide a massively parallel computer system for multi-media and general purpose applications, including the use of a finite difference method of solving differential equations. Our processor is a triangular processor array structure. Our processor array structure has single and dual processing elements that contain instruction and data storage units, receive instructions and data, and execute instructions and a processor interconnection organization and a way to support data initialization, parallel functions, wrap-around, and broadcast processor communications.

The computer has preferably $N^2$ processing units placed in the form of an N by N matrix that has been folded along the diagonal and made up of single processor diagonal units and dual processor general units that are interconnected by a nearest neighbor with wrap-around interconnection structure. In the computer each processing element or PE is a unit of the matrix. Each processor is identified with a reference notation to the original N by N matrix prior to folding that supports the transport of N by N matrix algorithms to triangular array algorithms.

Prior to folding, each PE has four ports, and there are $N^2$ processing units each possessing North, South, East and West I.O ports for nearest neighbor with wrap-around communications placed in the form of an N by N matrix that has been folded along the diagonal and allows the sharing of the North and South I/O ports with the East and West I/O ports.

For our processor with an N by N matrix the way of connecting processors is with a process providing a non-conflicting interprocessor communication's mechanism. For example, a mechanism that utilizes a unidirectional communication strategy between processors can be utilized on the Oracle array processor. The non-conflicting interprocessor communication's mechanism can be obtained by requiring all processors utilize a unidirectional and same direction communication strategy.

With our notation each said processing unit is identified by a two subscript notation $PE_{column,row}$ in reference to the original N by N matrix prior to folding. Accordingly the computing apparatus will have $K(N^2)$ interconnection wires where K is the number of wires between processors, which for bit-serial interfaces K can be one (K=1). We support single processor diagonal units. The apparatus has single processor diagonal units, identified as $PE_{i,j}$, including data storage elements, an execution unit, a broadcast interface for the communications of instructions and data, a data storage interface supporting initialization, and a nearest-neighbor with wrap-around interface, termed the interprocessor interface, and communication's means.

We have also provided new facilities for computation, and these are described in the detail below.

These and other improvements are set forth in the following detailed description. For a better understanding of the invention with advantages and features, reference may be had to the description and to the drawings.

BRIEF DESCRIPTION OF THE DRAWINGS

FIGS. 4A, 4B, 4C, 4D, 4E, 4F, 4G, 4H, 4I, and 4J show a symmetric PE "cell" structure supporting transposition and convolution.

FIGS. 7A and 7B show an 8×8 matrix transposed matrix P on square mesh (A) and on our preferred structure (B).

FIG. 8 shows a convolution window.

FIGS. 13A and 13B show a mesh superimposed over a region R.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

Our detailed description explains the preferred embodiments of our invention, together with advantages and features, by way of example with reference to the above drawings.

DETAILED DESCRIPTION OF THE INVENTION

INTRODUCTION

Figure 1:
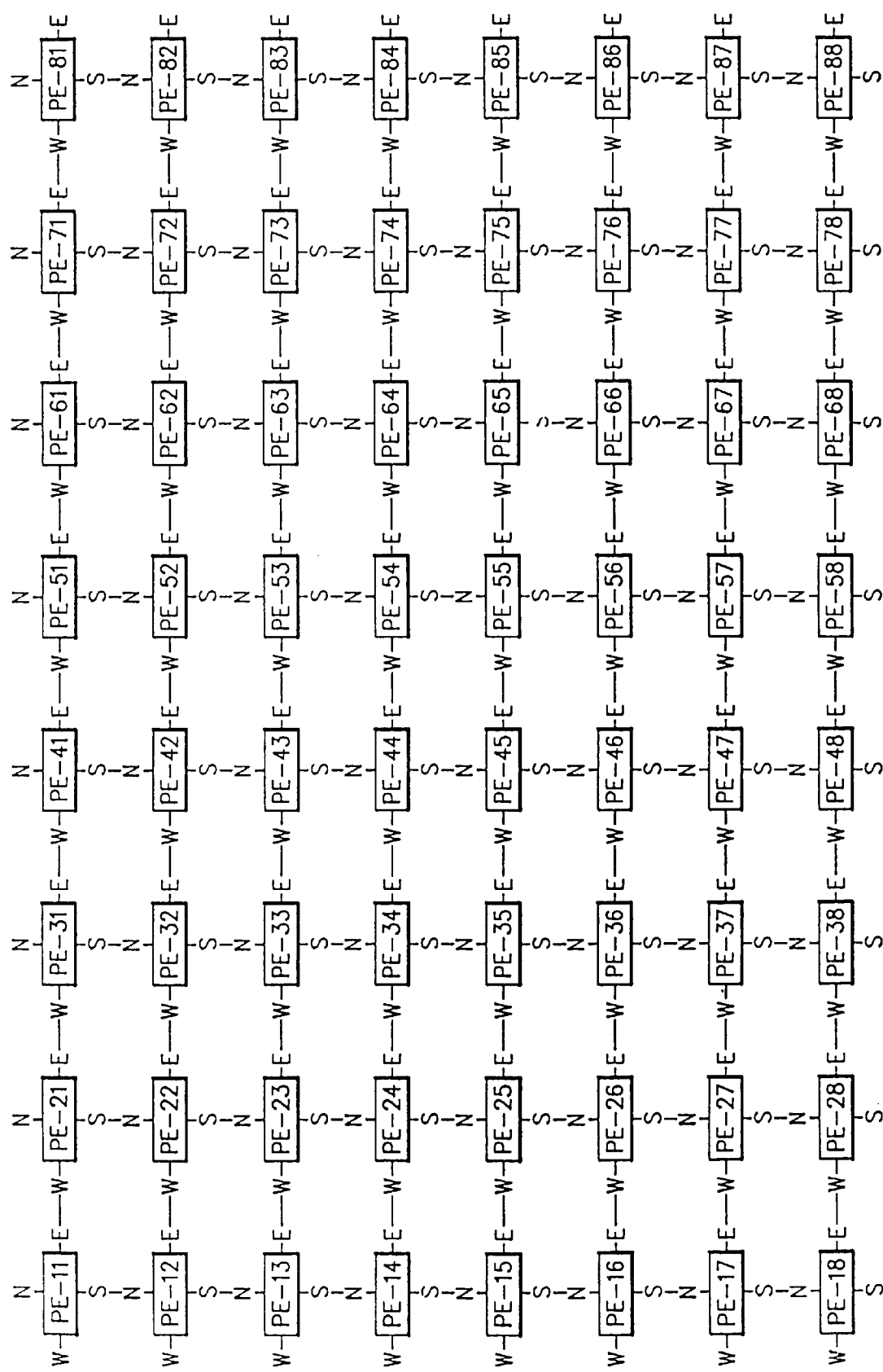
FIG. 1 shows a 8×8 mesh for convolution image processing.

Referring now to the Figures, an example mesh computer is depicted in FIG. 1. To minimize wiring complexity, bit serial interfaces between PEs are assumed. In FIG. 1, the processing elements are labeled as $PE_{ij}$ where "i" denotes the matrix column and "j" denotes the matrix row. Each $PE_{ij}$ processing element contains four interface ports labeled North (N), East (E), South (S), and West (W). With wraparound connections, i.e. a torus configuration, each row contains N interconnection wires and with N rows, there are $N^2$ horizontal interconnection wires. Each column contains N interconnection wires and with N columns, there are $N^2$ vertical interconnection wires. The total number of wires in the mesh connected computer with wraparound connections is $2N^2(K)$, where K is equal to the number of interprocessor interconnection wires which for bit-serial interfaces K can be equal to 1.

In accordance with our invention we have preferred to describe our invention with bit-serial interfaces. We should here note that it will be possible to have effective parallel interfaces through other expedients. For instance, the application of Howard Olnowich, discloses a way for use of a protocol to interface bit-serial communication with parallel communication in a multi-system environment as described in U.S. Ser. No. 07/799,602, filed Nov. 27, 1991, in his application entitled: "Multi-Media Serial Line Switching Adapter for Parallel Networks and Heterogenous and Homologous Computer Systems". This application is incorporated by reference.

With appropriate network connections our machine may be employed with systems which allow dynamic switching between MIMD, SIMD, and SISD modes, as described in U.S. Ser. No. 07/798,788, filed Nov. 27, 1991, by P. M. Kogge, in his application entitled: "Dynamic Multi-mode Parallel Processor Array Architecture". Our PE can form part of a parallel array processor composed of many nodes, each node having its PE and Memory, and ports to communicate externally with other nodes.

Figures 2, 6A, 6B:
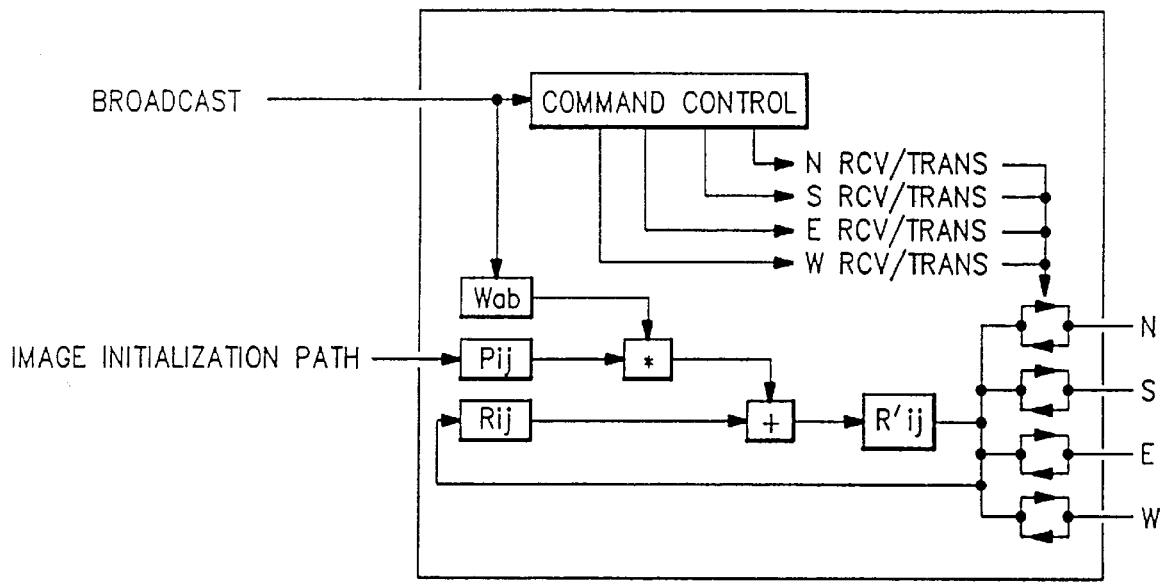
FIG. 2 shows a mesh PE internal structure.
FIGS. 6A and 6B show an 8×8 matrix P on square mesh (A) and on our preferred structure (B).

FIG. 2 depicts a typical mesh PE for use in implementing the image processing convolution algorithm as adapted from Lee (Additional Reference 5) with a more explicit depiction of the N, S, E, and W transmitting/receiving ports. The PE consists of four internal registers, $W_{ab}$, $P_{ij}$, $R_{ij}$, and $R'_{ij}$. The $P_{ij}$ register holds the $ij^{th}$ pixel value as initialized through an image initialization path, which could be through LSSD (See Additional Reference 6) scan paths.

The $W_{ab}$ register is loaded with an element of the convolution window through the broadcast mechanism and results of calculations are loaded into the $R'_{ij}$ register. Results transmitted between PEs are received into the $R_{ij}$ register. The PEs also contain a bit-serial multiplier, indicated by the "*" and a bit-serial adder indicated by the "+". For communication purposes, each PE contains four input/output ports whose transmission/reception direction are controlled by "Command Control" logic based upon decoded broadcast commands. The "Command Control" logic allows only one port to be transmitting and one port to be receiving at a time. For example, if port "N" is transmitting then port "S" will be receiving and if port "W" is transmitting then port "E" will be receiving. This follows from the restriction of unidirectional transmission of information between PEs.

Figure 3B:
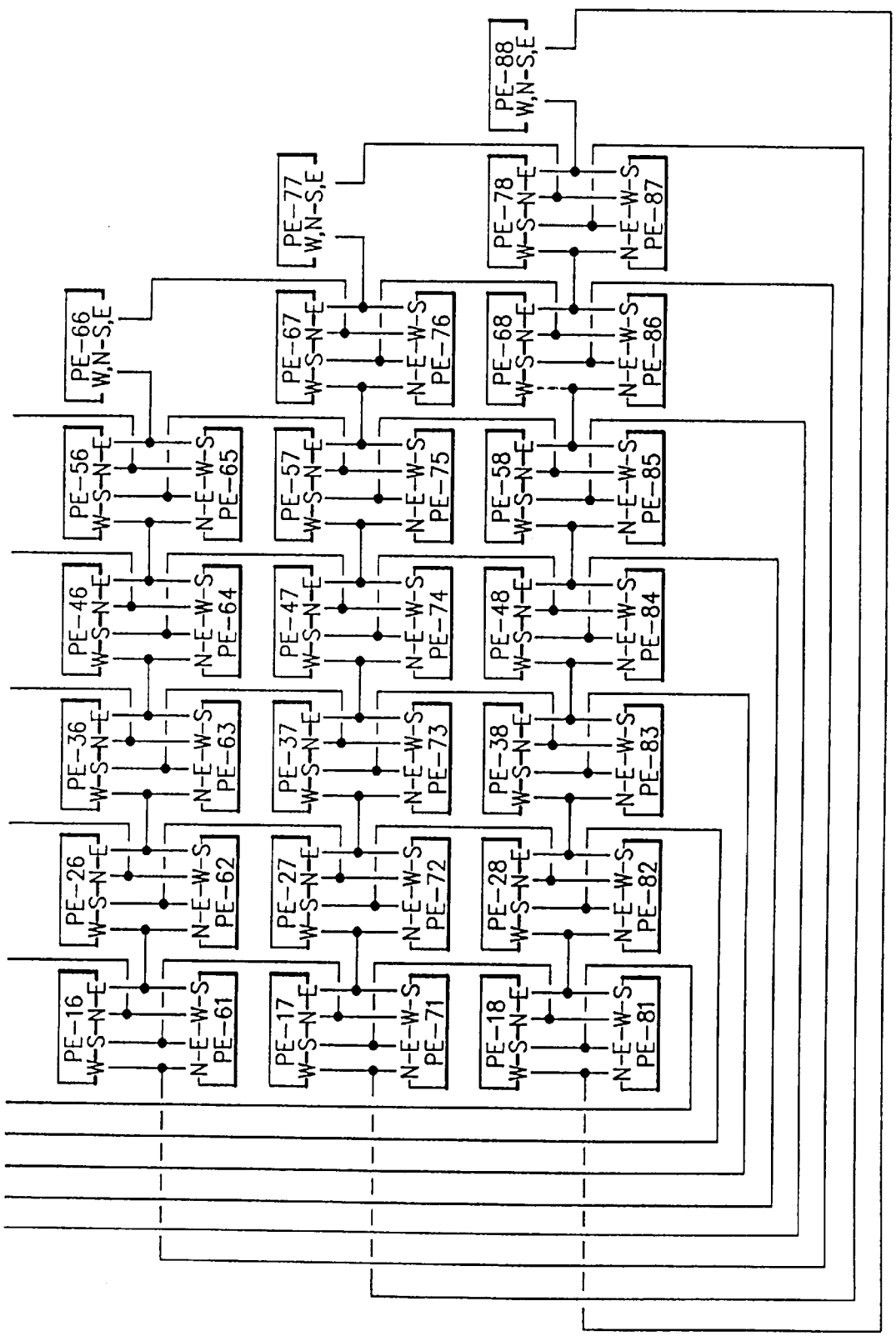
FIG. 3 shows an 8×8 mesh in accordance with our preferred embodiment.
Figure 4A:
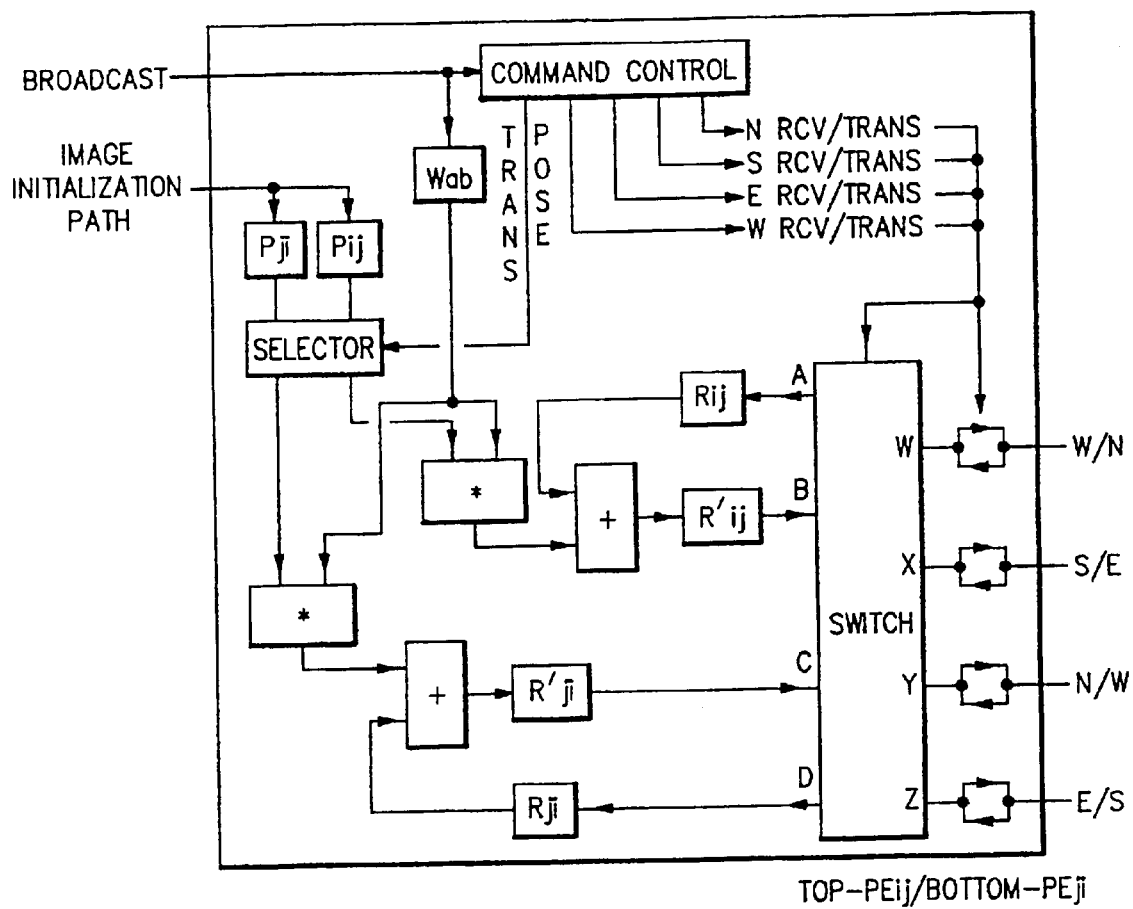

In the mesh connected computer organization of FIG. 1 and the PE internal structure of FIG. 2, it can be noted that during any transmission of information in the structure only 50% of the PE connection wires are utilized. It is desirable to achieve the same functionality and performance as the mesh connected computer with half the connecting wires since this amounts to a savings of $N^2$ wires with corresponding savings in chip real estate. The Oracle computer organization achieves this capability. The first step in the process of creating the Oracle organization of PEs is to fold a mesh connected computer along the $PE_{ij}$ diagonal elements, i.e. "i=j". For example, folding the 8×8 mesh depicted in FIG. 1 results in the Oracle mesh shown in FIG. 3, where the symmetric PEs, $PE_{ij}$ and $PE_{ji}$ are placed together. The symmetric PEs share transmission and reception ports, symbolically indicated in FIG. 3 where the top PE's, $PE_{ij}$ W, S, N, and E ports are shared with the bottom PE's, $PE_{ji}$ N, E, W, and S ports respectively. This sharing of I/O ports in the symmetric PEs is shown in greater detail in FIG. 4 Oracle Symmetric PE "Cell" Structure. In FIG. 4A, the internal symmetric PE "cell" consists of a common $W_{ab}$ register for both internal PEs, two pixel registers labeled $P_{ij}$ and $P_{ji}$, a Selector which allows selection of the matrix P or its transpose $p^T$, two result registers $R'_{ij}$ and $R'_{ji}$, and two receiving registers $R_{ij}$ and $R_{ji}$. The PEs also contain a bit-serial multiplier, indicated by the "*" and a bit-serial adder indicated by the "+". Only four I/O ports are utilized in the symmetric dual PE "cell" as controlled from a single "Command Control" logic that decodes broadcast commands. The "Command Control" logic controls not only the direction of the I/O ports but also the setting of the switches linking the I/O ports to the transmitting and receiving registers. The shared I/O ports are indicated as (top PE direction port label)/(bottom PE direction port label) where $PE_{ij}$ represents the top PE and $PE_{ji}$ represents the bottom PE. The choice of top and bottom PE notation is for ease of discussion and representation only.

Figure 4B:
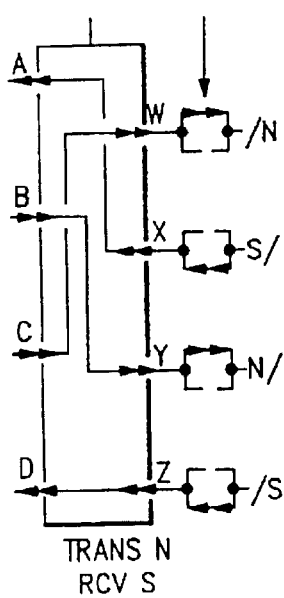
Figure 4C:
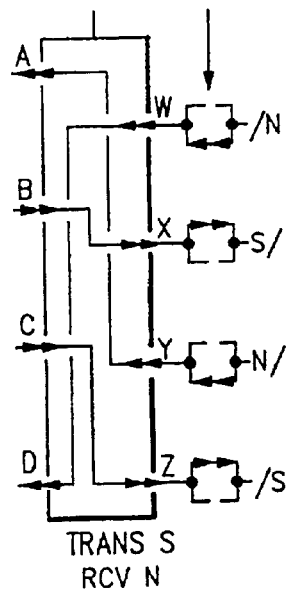
Figure 4D:
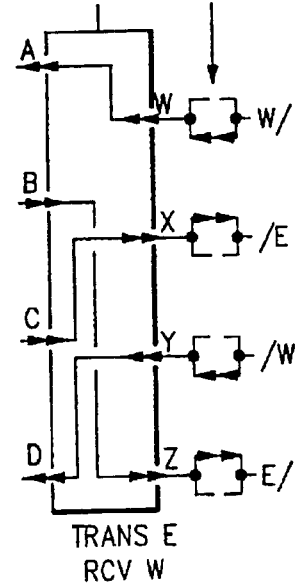
Figure 5A:
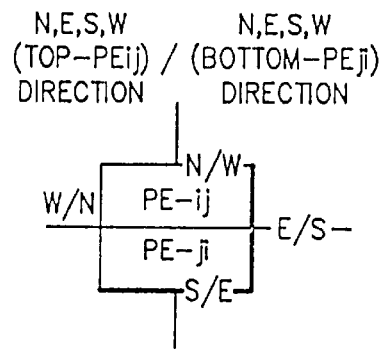
FIGS. 5A and 5B show an 8×8 mesh redrawn with our preferred PE symbolism.
Figure 5B:
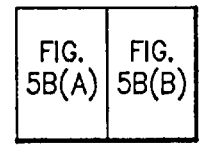
Figure 5B:
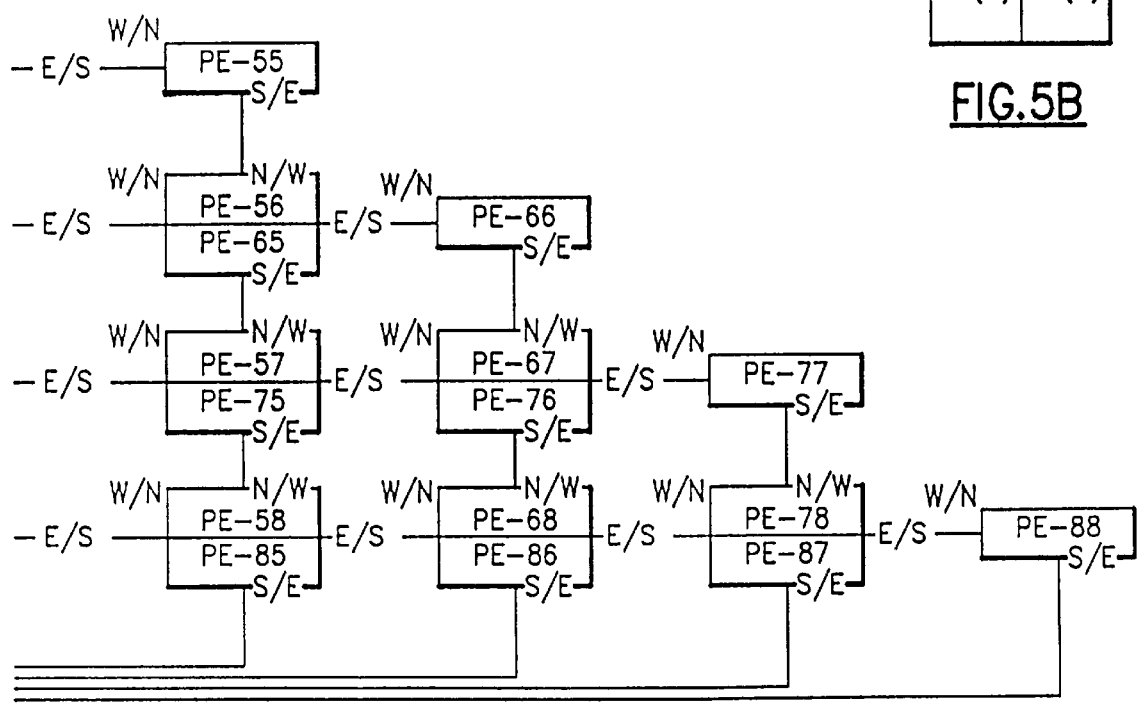
Figure 5B:
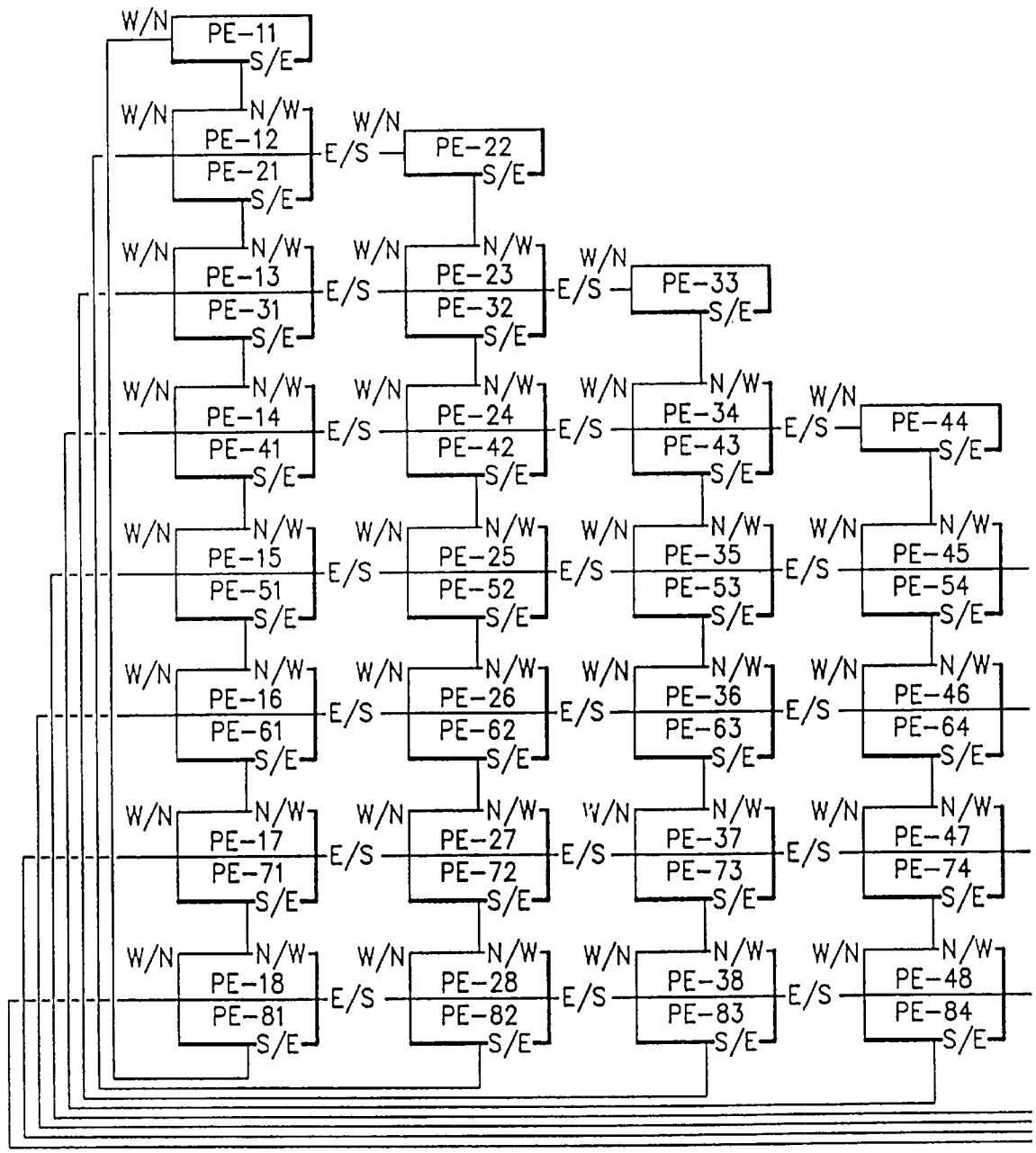

FIGS. 4B through 4E depict the setting of the internal switches in support of the four transmission modes. In FIG. 4B the "Command Control" has set up the switches and transmitters/receivers for a transmission North (N) with reception from the South (S). Both the top and bottom PEs transmit North while both are receiving information from the South. This is indicated by following the arrows in FIG. 4B and the notation "N/_" for the top $PE_{ij}$ transmission and "_/N" for the bottom $PE_{ji}$ transmission. The information received is indicated by the arrows in FIG. 4B and the notation "S/_" for the top $PE_{ij}$ receiving port and "_/S" for the bottom $PE_{ji}$ receiving port. Using this notation for the four I/O ports in the symmetric PE "cells", a simplified symbology can be constructed for the symmetric PEs as shown in FIG. 5A where $PE_{ij}$ is the top PE and $PE_{ji}$ is the bottom PE. Utilization of this symbology in the Oracle organization results in a simplified diagram FIG. 5B indicating the regularity of the wiring between the cells.

The dual processors internal switch consists of eight connection points A, B, C, D, and W, X, Y, and Z, where:

point A is connected to processor $P_{i,j}$'s register $R_{i,j}$ that receives data from the interprocessor interface, point B is connected to processor $P_{i,j}$'s register $R'_{i,j}$ that supplies data to the interprocessor interface, point C is connected to processor $P_{j,i}$'s register $R'_{j,i}$ that supplies data to the interprocessor interface point D is connected to processor $P_{j,i}$'s register $R_{j,i}$ that receives data from the interprocessor interface, point W is connected to receiving/transmitting mechanisms for the transmission and reception of data between the $PE_{i,j}$'s West and $PE_{j,i}$'s North neighbor PEs, point X is connected to receiving/transmitting mechanisms for the transmission and reception of data between the $PE_{i,j}$'s South and $PE_{j,i}$'s East neighbor PEs, point Y is connected to receiving/transmitting mechanisms for the transmission and reception of data between the $PE_{i,j}$'s North and $PE_{j,i}$'s West neighbor PEs, point Z is connected to receiving/transmitting mechanisms for the transmission and reception of data between the $PE_{i,j}$'s East and $PE_{j,i}$'s South neighbor PEs, The dual processor switch provides connection/no connection paths between points A, B, C, D and points W, X, Y, and Z dependent upon the switch state. In the one switch state connection paths between points A and W, B and Z, C and X, and D and Y are provided for Transmit East Receive West. In a second switch state connection paths between points A and X, B and Y, C and W, and D and Z are provided for Transmit North Receive South. In a third switch state connection paths between points A and Y, B and X, C and Z, and D and W are provided for Transmit South Receive North and in a fourth switch state connection paths between points A and Z, B and W, C and Y, and D and X are provided for transmit West Receive East. It should be noted that the receiving/transmitting mechanisms consists of four bi-directional driver/receiver mechanisms each responsive in one state to drive signals from the PE to an attached receiving PE and responsive in another state to receive signals to the PE from an attached transmitting PE and controls are provided to ensure that of the four bi-directional driver/receiver mechanisms only two are simultaneously transmitting data and two are simultaneously receiving data for the four cases of Transmit East Receive West, Transmit North Receive South, Transmit South Receive North, and Transmit West Receive East.

The diagonal PEs, FIG. 4F, share the West/North ports and the South/East ports requiring only two ports per diagonal PE "cell". FIGS. 4G through 4J depict the setting of the internal switches in support of the four transmission modes. The diagonal processor internal switch mechanism consists of four connection points A, B, X, and Y, where point A is connected to the receiving data register $R_{i,i}$, point B is connected to register $R'_{i,i}$ that supplies data to the interprocessor interface, point X is connected to receiving/transmitting mechanisms for the transmission and reception of data between the diagonal PE's West and North (W/N) neighbor PEs, and point Y is connected to receiving/transmitting mechanisms for the transmission and reception of data between the diagonal PE's South and East (S/E) neighbor PEs. The diagonal switch provides connection/no connection paths between points A, B and points X, Y dependent upon the switch state. In one switch state a connection path between points A and X and between points B and Y is provided for two transmission/reception cases, namely transmission South, through point Y, reception North, through point X, and transmission East, through point Y, reception West, through point X. In a second switch state a connection path between points A and Y and between points B and X is provided for two transmission/reception cases, namely transmission North, through point X, reception South, through point Y, and transmission West, through point X, reception East, through point Y. It should be noted that the receiving/transmitting mechanisms consists of two bi-directional driver/receiver mechanisms each responsive in one state to drive signals from the PE to an attached receiving PE and responsive in another state to receive signals to the PE from an attached transmitting PE and controls are provided to ensure that the bi-directional driver/receiver mechanisms are not both simultaneously driving or both simultaneously receiving data.

The folding of the square mesh structure along the diagonal places the top edge of the square mesh in line with the West edge and the East edge of the square mesh in line with the South edge. The 2N wraparound connections of the square mesh computer organization which are between the North/South edges and the East/West edges of the square array can be shared in the Oracle mesh organization requiring only N wraparound connections. Counting the Oracle horizontal interconnection wiring and considering the wraparound connections as horizontal wires results in:

Oracle Horizontal & Wrap around Wires =
$$(1 + 2 + \cdots + N)K = \left(N\frac{(N+1)}{2}\right)K$$

Counting the Oracle vertical interconnection wiring results in:

$$\text{Oracle Vertical Wires} = (1 + 2 + \cdots + N - 1)K = \left(N\frac{(N+1)}{2}\right)K$$

The total number of Oracle wires is:

Total Number of Oracle Wires =
$$\left(N\frac{(N+1)}{2} + N\frac{(N-1)}{2}\right)K = N^2(K)$$

Where K is equal to the number of interprocessor interconnection wires which for bit-serial interfaces K can be 1. The total number of Oracle wires is demonstrated to be exactly one half the number of wires required by the square mesh organization.

Under the restriction of uni-directional information transfer between PEs, the two computer organizations are next demonstrated to be functionally equivalent. Four cases must be reviewed, namely:

1. Transmit North Receive South
2. Transmit South Receive North
3. Transmit East Receive West
4. Transmit West Receive East It is shown that the destination points for information transmitted between the PEs is the same in Oracle as it is in the mesh connected organization. For a $PE_{ij}$ 1. Transmit North $PE_{ij} \rightarrow PE_{ij-1}$
2. Transmit South $PE_{ij} \rightarrow PE_{ij+1}$
3. Transmit East $PE_{ij} \rightarrow PE_{i+1j}$
4. Transmit West $PE_{ij} \rightarrow PE_{i-1j}$ Where: if i−1=0 or j−1=0 then set i=N or j=N and if i+1>N or j+1>N then set i=1 or j=1 for the wrap-around connections.

In Oracle, we will consider first the symmetric dual PE "cells" where in the top PE "cells" i<j and in the bottom PE "cells" i>j since the "i" and "j" values are interchanged. This first consideration accounts for all PEs except the diagonal cells which are considered next. For the symmetric dual PE "cells" and where: if i−1=0 or j−1=0 then set i=N or j=N and if i+1>N or j+1>N then set i=1 or j=1 for the wrap-around connections:

1. Transmit North Receive South:
   $PE_{ij}$ transmits on the N/W wire to $PE_{ij-1}$
   $PE_{ij}$ receives on the S/E wire from $PE_{ij+1}$
   $PE_{ji}$ transmits on the W/N wire to $PE_{ji-1}$
   $PE_{ji}$ receives on the E/S wire from $PE_{ji+1}$
2. Transmit South Receive North:
   $PE_{ij}$ transmits on the S/E wire to $PE_{ij+1}$
   $PE_{ij}$ receives on the N/W wire from $PE_{ij-1}$
   $PE_{ji}$ transmits on the E/S wire to $PE_{ji+1}$
   $PE_{ji}$ receives on the W/N wire from $PE_{ji-1}$
3. Transmit East Receive West:
   $PE_{ij}$ transmits on the E/S wire to $PE_{i+1j}$
   $PE_{ij}$ receives on the W/N wire from $PE_{i-1j}$
   $PE_{ji}$ transmits on the S/E wire to $PE_{j+1i}$
   $PE_{ji}$ receives on the N/W wire from $PE_{j-1i}$
4. Transmit West Receive East:
   $PE_{ij}$ transmits on the W/N wire to $PE_{i-1j}$
   $PE_{ij}$ receives on the E/S wire from $PE_{i+1j}$
   $PE_{ji}$ transmits on the N/W wire to $PE_{j-1i}$
   $PE_{ji}$ receives on the S/E wire from $PE_{j+1i}$ For the diagonal "cells" where i=j the following information transfers occur:

1. Transmit North Receive South:
   $PE_{ii}$ transmits on the W/N wire to $PE_{ii-1}$
   $PE_{ii}$ receives on the S/E wire from $PE_{ii+1}$
2. Transmit South Receive North:
   $PE_{ii}$ transmits on the S/E wire to $PE_{ii+1}$
   $PE_{ii}$ receives on the W/N wire from $PE_{ii-1}$
3. Transmit East Receive West:
   $PE_{ii}$ transmits on the E/S wire to $PE_{i+1i}$
   $PE_{ii}$ receives on the W/N wire from $PE_{i-1i}$
4. Transmit West Receive East:
   $PE_{ii}$ transmits on the W/N wire to $PE_{i-1i}$
   $PE_{ii}$ receives on the E/S wire from $PE_{i+1i}$ In all cases no conflicts occur and the correct destination points remain the same as in the square mesh connected organization of PEs.

MATRIX TRANSPOSITION

In the transposition of matrix "$P^T$", the row vectors of the matrix become the column vectors of the transposition matrix "$P^T$" An arbitrary element $p_{ab}$ of matrix "P" becomes element $p_{ba}$ in the transposition matrix "$P^T$". The diagonal elements remain the same. In Oracle a matrix "P" and its transpose can be easily selected since both the element $p_{ab}$ and its corresponding element $p_{ba}$ are present in the dual elements. A selector at the output of the "p" registers allows the use of the elements in "P" or in "$P^T$" in specified operations. For example, a "P" matrix is shown in FIG. 6A and as loaded on to Oracle is shown in FIG. 6B.

Figure 9A:
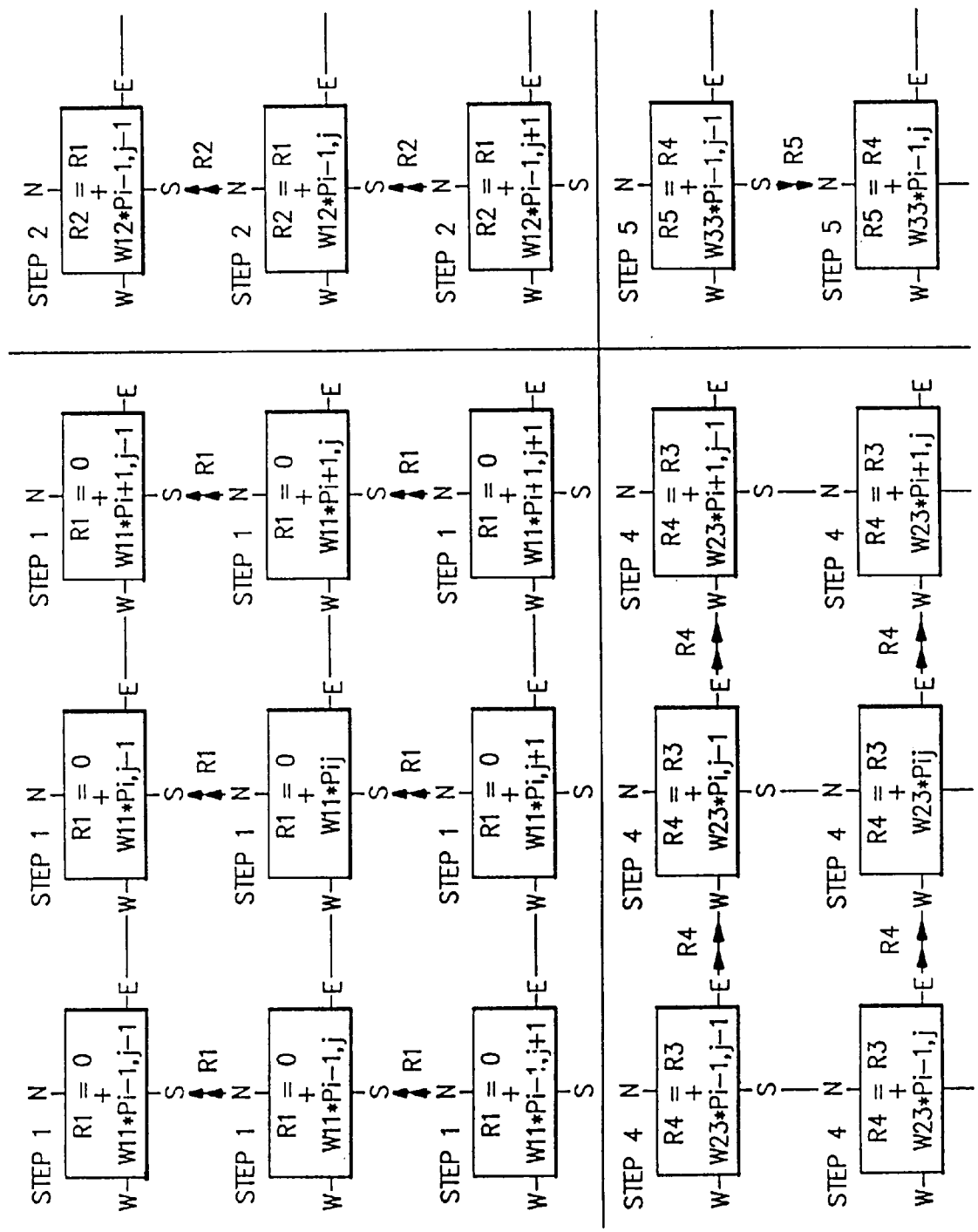
FIG. 9 shows a generalized mesh for convolution image processing.
Figure 9B:
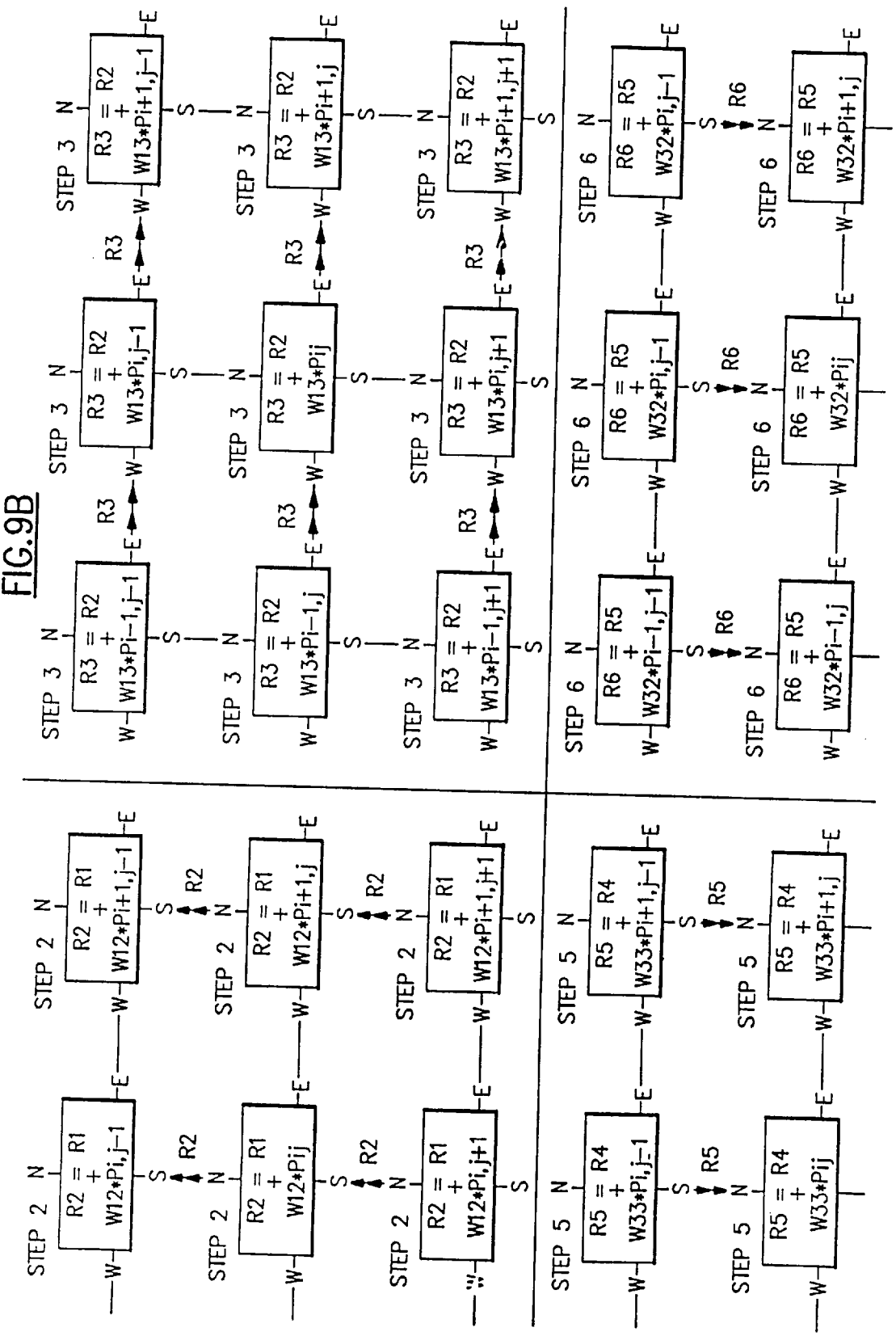
Figure 9D:
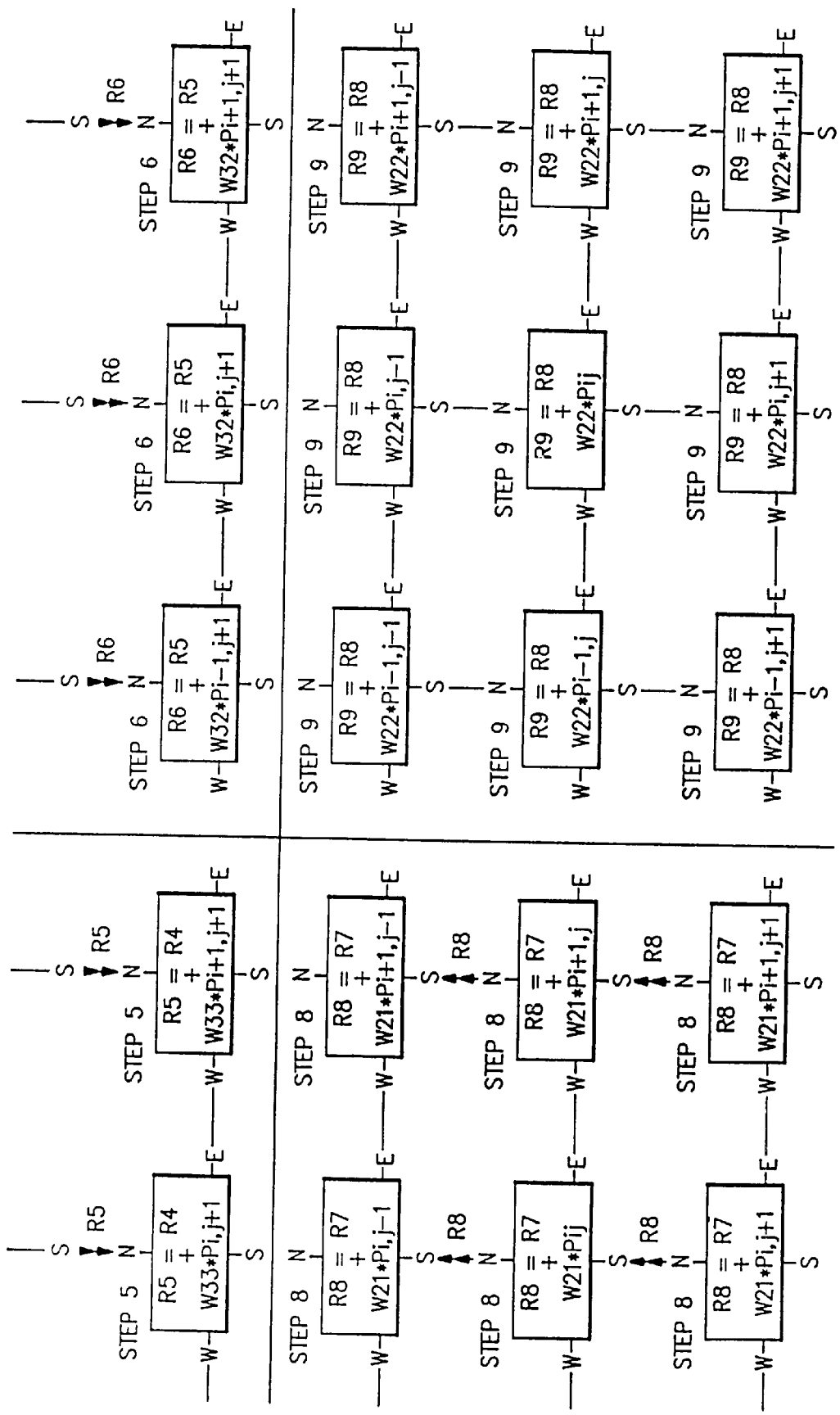
Figure 10A:
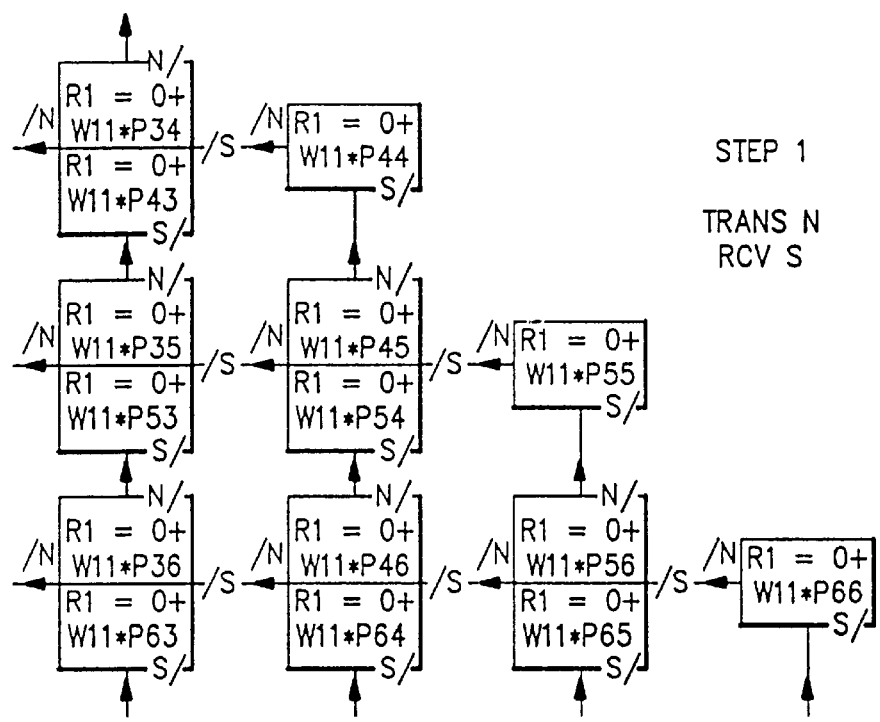
FIG. 10 shows a convolution for pixel P45—Steps 1 through 4.
Figure 10A:
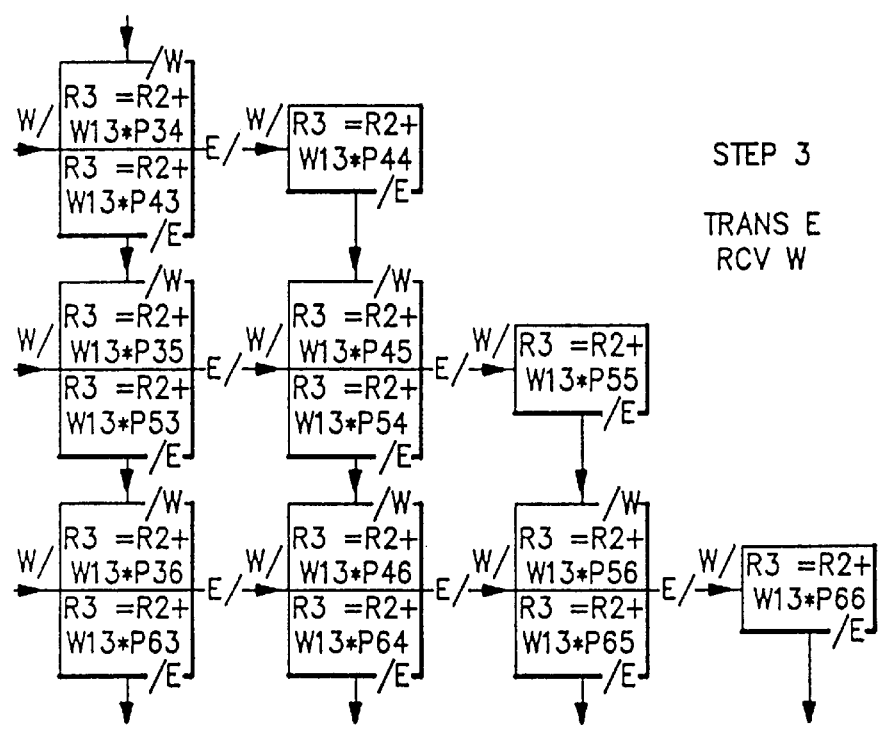
Figure 10B:
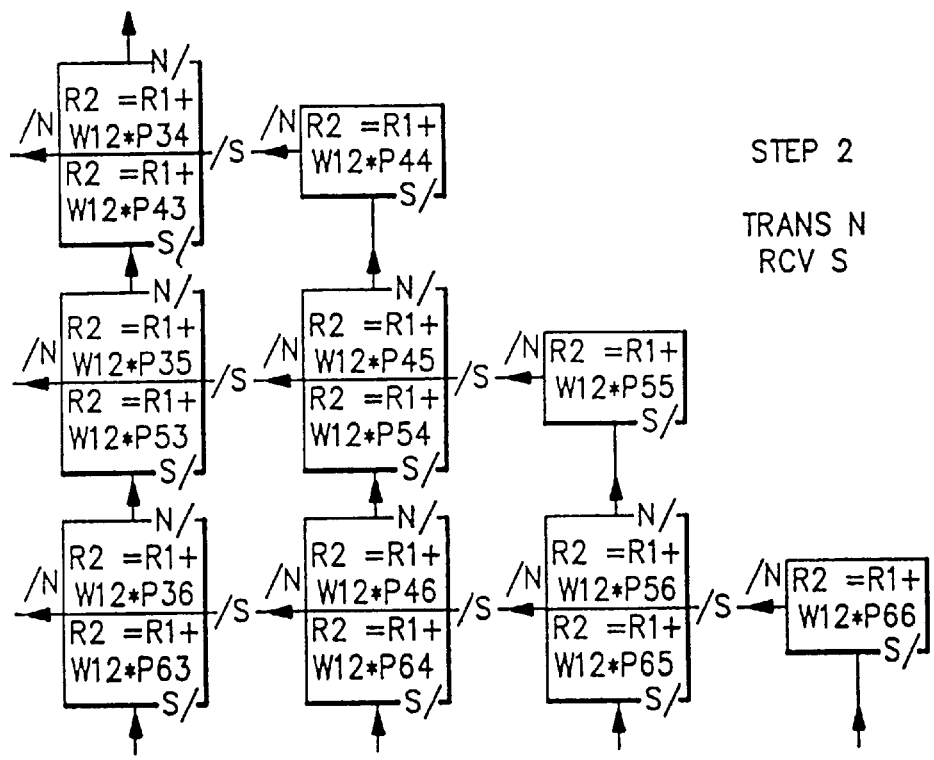
Figure 10B:
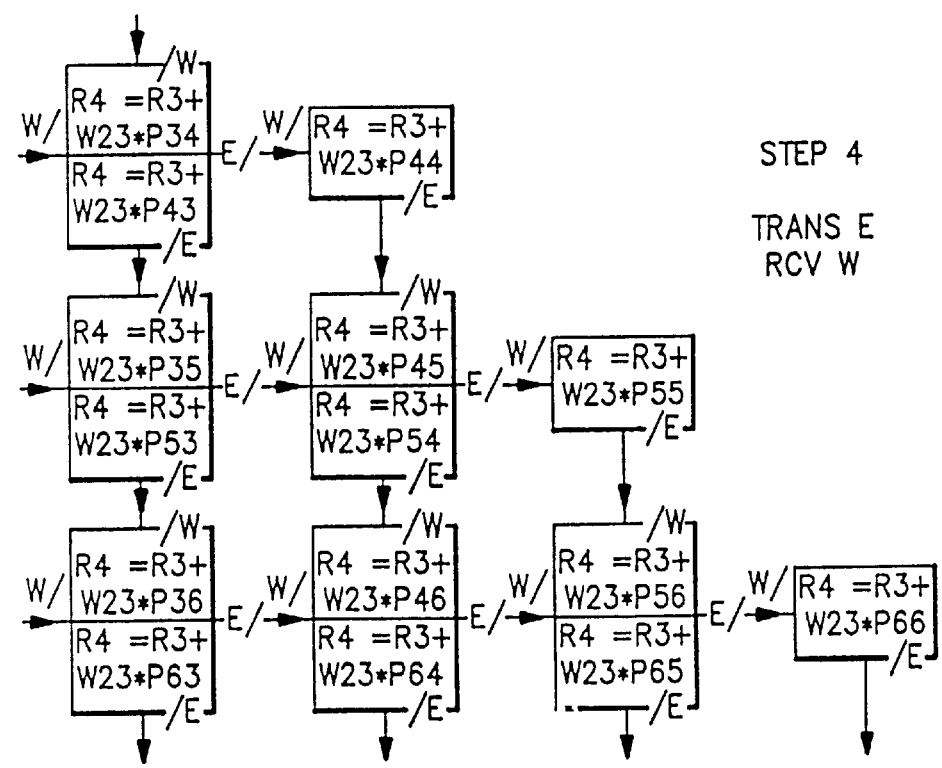
Figure 11A:
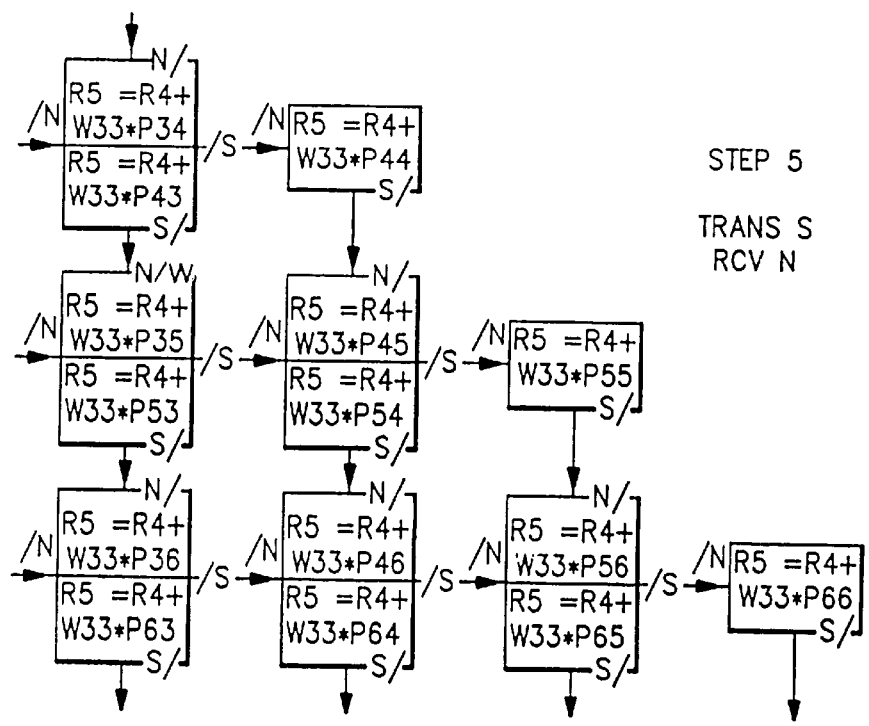
FIG. 11 shows a convolution for pixel P45—Steps 5 through 8.
Figure 11A:
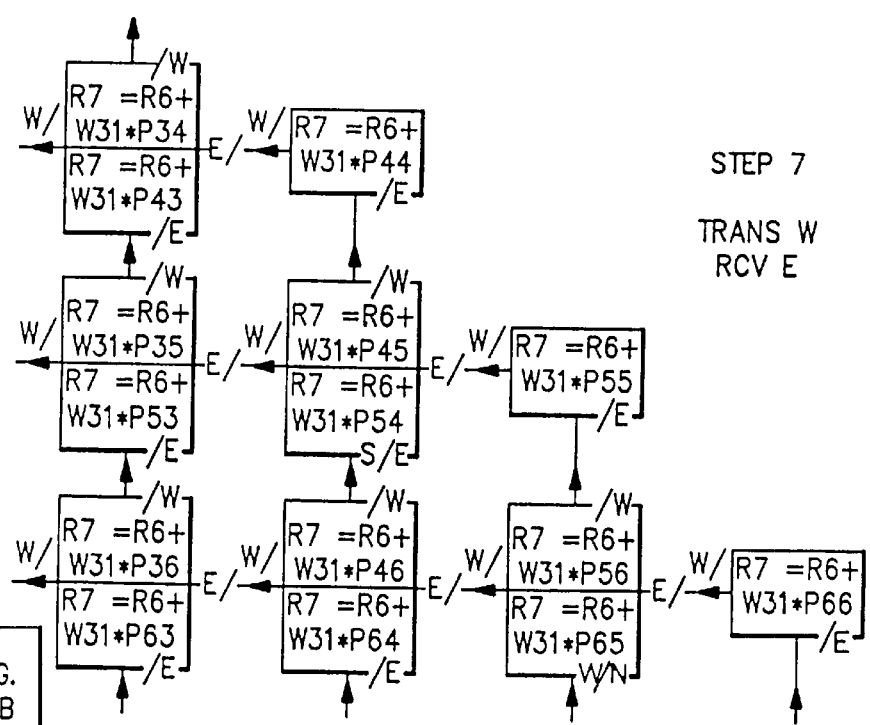
Figure 11B:
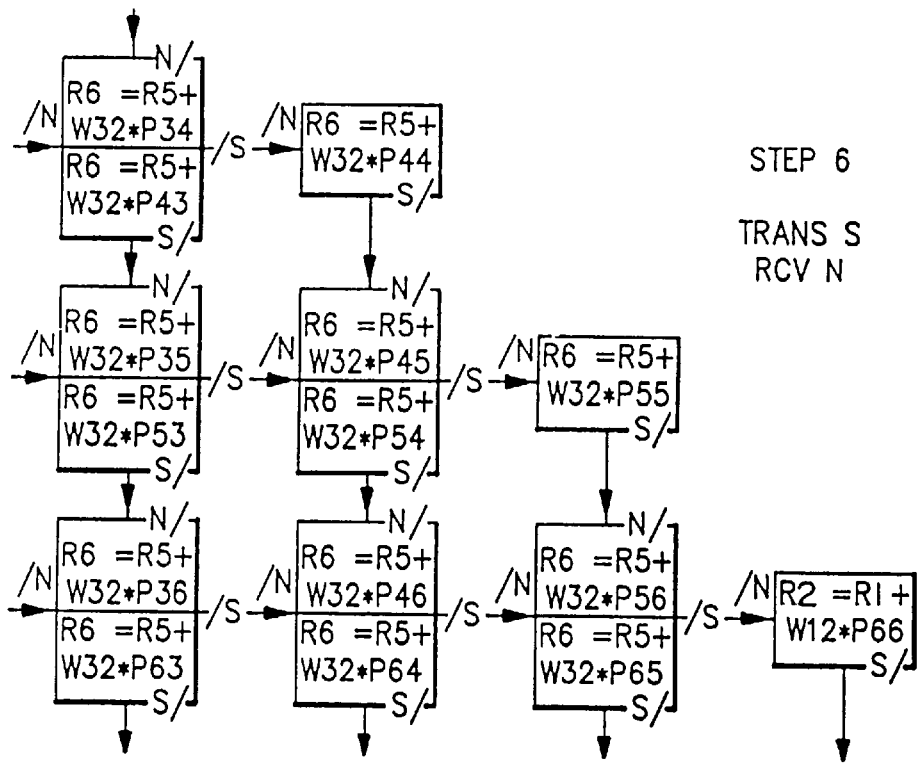
Figure 11B:
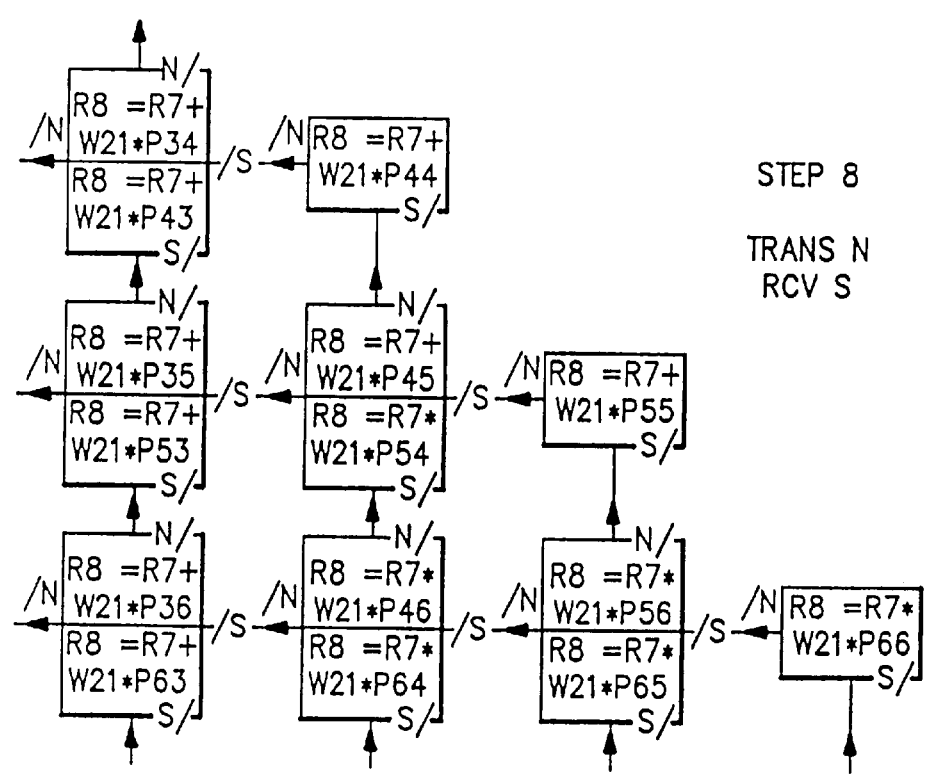

The transpose of matrix P is $P_T$ and is shown in FIG. 7A and as loaded onto Oracle is shown in FIG. 7B:

FIG. 8 represents a convolution window. FIG. 9 illustrates image processing convolution on a square mesh. For the image processing task considered in this paper a 2-D convolution with a 3×3 convolution window, FIG. 8, will be assumed. The technique employed on the mesh structure is that proposed by S.-Y. Lee and J. K. Aggarwal. The processing element internal structure is logically depicted in FIG. 2, as adapted from Lee with a more explicit depiction of the N, S, E, W Transmitting/Receiving ports.

Assuming an N×N image is already loaded into the N×N mesh $P_{ij}$ registers and the $R'_{ij}$ registers are set to zero, the convolution algorithm can begin with the broadcast of the first window element $W_{11}$. The following steps are followed for the $P_{ij}$ convolution path where each step in the path is depicted with its corresponding step number in FIG. 9: (It should be noted that all PEs calculate the same operations on their pixel values and received partial summation values.)

1. Broadcast $W_{11}$ and $PE_{i-1,j+1}$ calculates $R1=0+W_{11}P_{i-j+1}$ and transfers R1 North.
2. Broadcast $W_{12}$ and $PE_{i-1,j}$ calculates $R2=R1+W_{12}P_{i-1,j}$ and transfers R2 North.
3. Broadcast $W_{13}$ and $PE_{i-1,j-1}$ calculates $R3=R2+W_{13}P_{i-1,j-1}$ and transfers R3 East.
4. Broadcast $W_{23}$ and $PE_{ij-1}$ calculates $R4=R3+W_{23}P_{i,j-1}$ and transfers R4 East.
5. Broadcast $W_{33}$ and $PE_{i+1,j-1}$ calculates $R5=R4+W_{33}P_{i+1,j-1}$ and transfers R5 South.
6. Broadcast $W_{32}$ and $PE_{i+1,j}$ calculates $R6=R5+W_{32}P_{i+1,j}$ and transfers R6 South.
7. Broadcast $W_{31}$ and $PE_{i+1,j+1}$ calculates $R7=R6+W_{31}P_{i+1,j+1}$ and transfers R7 West.
8. Broadcast $W_{21}$ and $PE_{ij+1}$ calculates $R8=R7+W_{21}P_{i,j+1}$ and transfers R8 North.
9. Broadcast $W_{22}$ and $PE_{ij}$ calculates $R9=R8+W_{22}P_{ij}$ and stop.

At the end of the nine steps each $PE_{ij}$ contains:

$$P_{ij}=R9=W_{11}P_{i-1,j+1}+W_{12}P_{i-1,j}+W_{13}P_{i-1,j-1}+W_{23}P_{i,j-1}+W_{33}P_{i+1,j-1}+W_{32}P_{i+1,j}+W_{31}P_{i+1,j+1}+W_{21}P_{i,j+1}+W_{22}P_{ij}$$

Figure 12:
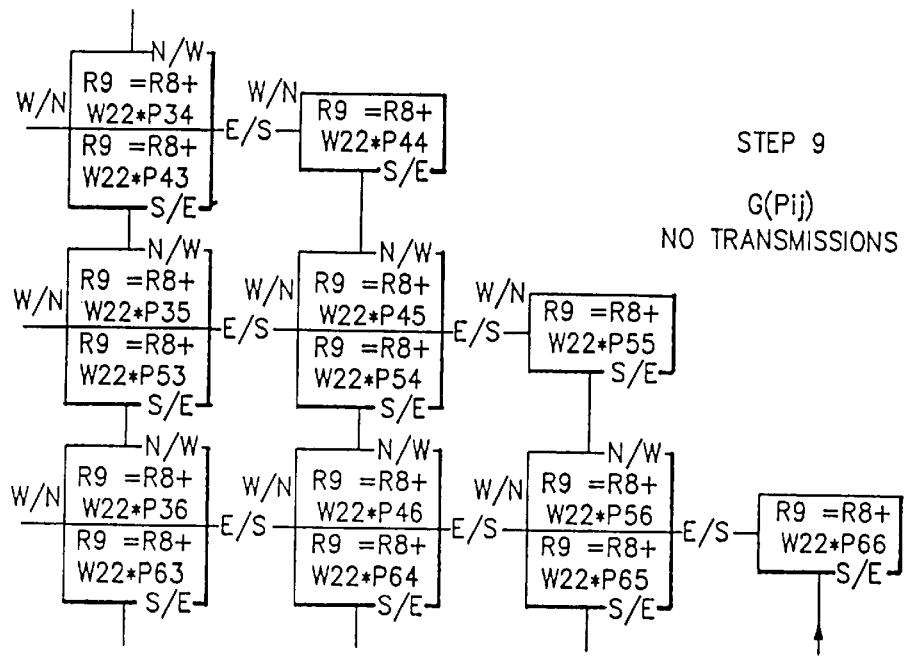
FIG. 12 shows a convolution for pixel P45—Step 9.

In a similar manner, the typical convolution operations on Oracle are depicted in FIGS. 10 through 12 for pixel $P_{45}$. Assuming an N×N image is already loaded into the Oracle $P_{ij}$ registers and the $R'_{ij}$ registers are set to zero, the convolution algorithm can begin with the broadcast of the first window element $W_{11}$. The following steps are followed for the $P_{ij}$ convolution path where each step in the path is depicted with its corresponding step number in FIGS. 10 through 12: (It should be noted that all PEs calculate the same operations on their pixel values and received partial summation values.)

1. Broadcast $W_{11}$ and $PE_{i-1,j+1}$ calculates $R1=0+W_{11}P_{i-1,j+1}$ and transfers R1 on the N/W wire.
2. Broadcast $W_{12}$ and $PE_{i-1,j}$ calculates $R2=R1+W_{12}P_{i-1,j}$ and transfers R2 on the N/W wire.
3. Broadcast $W_{13}$ and $PE_{i-1,j-1}$ calculates $R3=R2+W_{13}P_{i-1,j-1}$ and transfers R3 on the E/S wire.
4. Broadcast $W_{23}$ and $PE_{i,j-1}$ calculates $R4=R3+W_{23}P_{i,j-1}$ and transfers R4 on the E/S wire.
5. Broadcast $W_{33}$ and $PE_{i+1,j-1}$ calculates $R5=R4+W_{33}P_{i+1,j-1}$ and transfers R5 on the S/E wire.
6. Broadcast $W_{32}$ and $PE_{i+1,j}$ calculates $R6=R5+W_{32}P_{i+1,j}$ and transfers R6 on the S/E wire.
7. Broadcast $W_{33}$ and $PE_{i+1,j+1}$ calculates $R7=R6+W_{31}P_{i+1,j+1}$ and transfers R7 on the W/N wire.
8. Broadcast $W_{21}$ and $PE_{i,j+1}$ calculates $R8=R7+W_{21}P_{i,j+1}$ and transfers R8 on the N/W wire.
9. Broadcast $W_{22}$ and $PE_{ij}$ calculates $R9=R8+W_{22}P_{ij}$ and stop.

At the end of the nine steps each $PE_{ij}$ contains:

$$P_{ij}=R9=W_{11}P_{i-1,j+1}+W_{12}P_{i-1,j}+W_{13}P_{i-1,j-1}+W_{23}P_{i,j-1}+W_{33}P_{i+1,j-1}+W_{32}P_{i+1,j}+W_{31}P_{i+1,j+1}+W_{21}P_{i,j+1}+W_{22}P_{ij}$$

Which for pixel P45 is:

G(P45)=W11P36+W12P35+W13P34+W23P44+
W33P54+W32P55+W31P56+W21P46+W22P45

FINITE DIFFERENCE METHOD EXAMPLE

Finite difference methods for solving differential equations are widely used in a number of scientific and engineering fields such as physics, mechanical engineering, and electrical engineering. In such methods, the derivatives of a differential equation are approximated by difference quotients that may be obtained from a truncated Taylor series (Additional Reference 7).

In the finite difference method consider a second-order partial differential equation, equation (1):

$$A\frac{\partial^2 u}{\partial x^2}+B\frac{\partial}{\partial y}\frac{\partial u}{\partial x}+C\frac{\partial^2 u}{\partial y^2}+D\frac{\partial u}{\partial x}+E\frac{\partial u}{\partial y}+Fu=G \quad (1)$$

Here A, B, C, D, E, F, and G are functions of x and y and continuous in a region R with a boundary S. The function u(x,y) must be continuous in both R and S.

In finite difference methods, a mesh is superimposed over the region R (as shown in FIG. 13a) and the differential equation (1) is replaced by a difference equation at each mesh point. The partial derivatives are replaced by central difference quotients equations 2a–2d (FIG. 13b).

$$\frac{\partial u}{\partial x} \simeq [u(x+h_x, y)-u(x-h_x, y)]/(2h_x) \quad (2a)$$

$$\frac{\partial u}{\partial y} \simeq [u(x, y+h_y)-u(x, y-h_y)]/(2h_y) \quad (2b)$$

$$\frac{\partial^2 u}{\partial x^2} \simeq [u(x+h_x, y)+u(x-h_x, y)-2u(x, y)]/h_x^2 \quad (2c)$$

$$\frac{\partial^2 u}{\partial y^2} \simeq [u(x, y+h_y)+u(x, y-h_y)-2u(x, y)]/h_y^2 \quad (2d)$$

Where $h_x$ and $h_y$ are the mesh spacing in the x and y axes respectively, FIG. 13b. Usually, the mesh spacing in both the horizontal and vertical directions is the same, equation 3:

$$h=h_x=h_y \quad (3)$$

Substituting equations (2a) through (2d) in equation (1) with B=0 and multiplying by $-h^2$, the following equation is obtained:

$$a_0 u(x,y)-a_1 u(x+h,y)-a_2 u(x,y+h)-a_3 u(x-h,y)-a_4 u(x,y-h)=t(x,y) \quad (4)$$

Where:

$$a_1 = A(x, y)+\frac{h}{2}D(x, y) \quad (5a)$$

$$a_2 = C(x, y)+\frac{h}{2}E(x, y) \quad (5b)$$

$$a_3 = A(x, y)-\frac{h}{2}D(x, y) \quad (5c)$$

-continued $$a_4 = C(x, y)-\frac{h}{2}E(x, y) \quad (5d)$$

$$a_0=a_1+a_2+a_3+a_4-h^2 F(x,y) \quad (5e)$$

$$t(x,y)=-h^2 G(x,y) \quad (5\theta)$$

If LaPlace's equation is considered:

$$\frac{\partial^2 u}{\partial x^2}+\frac{\partial^2 u}{\partial y^2}=0 \quad (6)$$

Where: A=C=1 and B=D=E=F=G=0

A unique solution may be obtained when the boundary conditions S in the region R are given. LaPlace's equation may be expressed as small differences. By substitution, the following equation (7a) is obtained:

$$4u(x,y)-u(x+h,y)-u(x,y+h)-u(x-h,y)-u(x,y-h)=0 \quad (7a)$$

Thus the value of u(x,y) can be computed by means of an iterative method using the formula (7b):

$$u(x,y)=[u(x+h,y)+u(x,y+h)+u(x-h,y)+u(x,y-h)]/4 \quad (7b)$$

LaPlace's and Poisson's equations are widely used in many theoretical and application problems, such as the analysis of vibrating membranes (Additional Reference 8).

Equation (7b) can be computed on Oracle by mapping equation (7b) to equation 8 using the Oracle notation as presented in the discussion of FIG. 4.

$$P(i,j)=[P(i+1,j)+P(i,j+1)+P(i-1,j)+P(i,j-1)]/4 \quad (8)$$

Figures 14B, 14C, 14D, 14E:
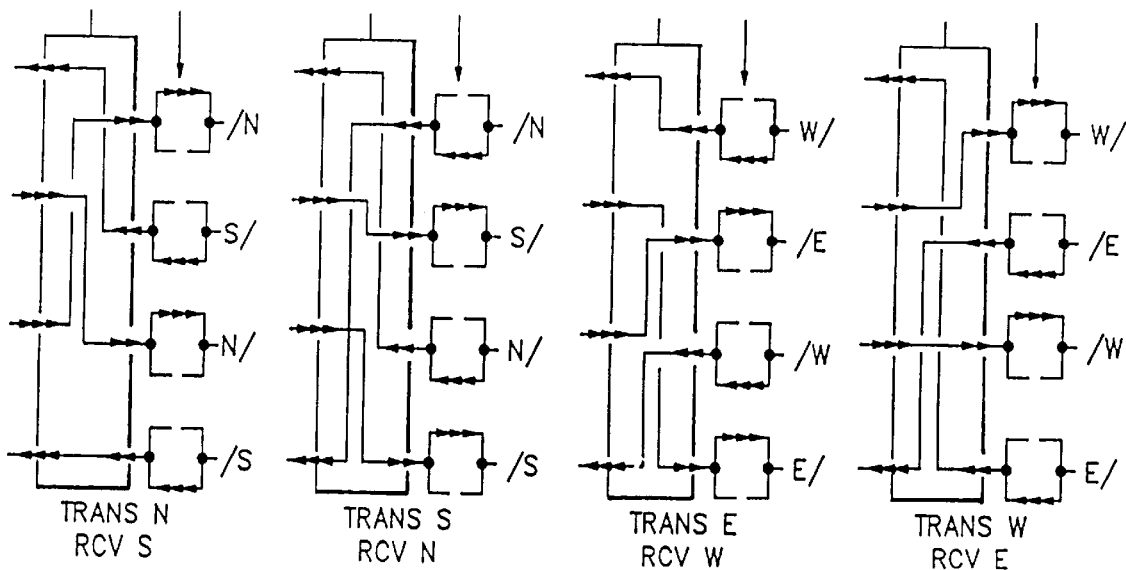
FIGS. 14A, 14B, 14C, 14D and 14E show a our symmetric PE "cell" structure supporting a finite difference method.
Figure 14A:
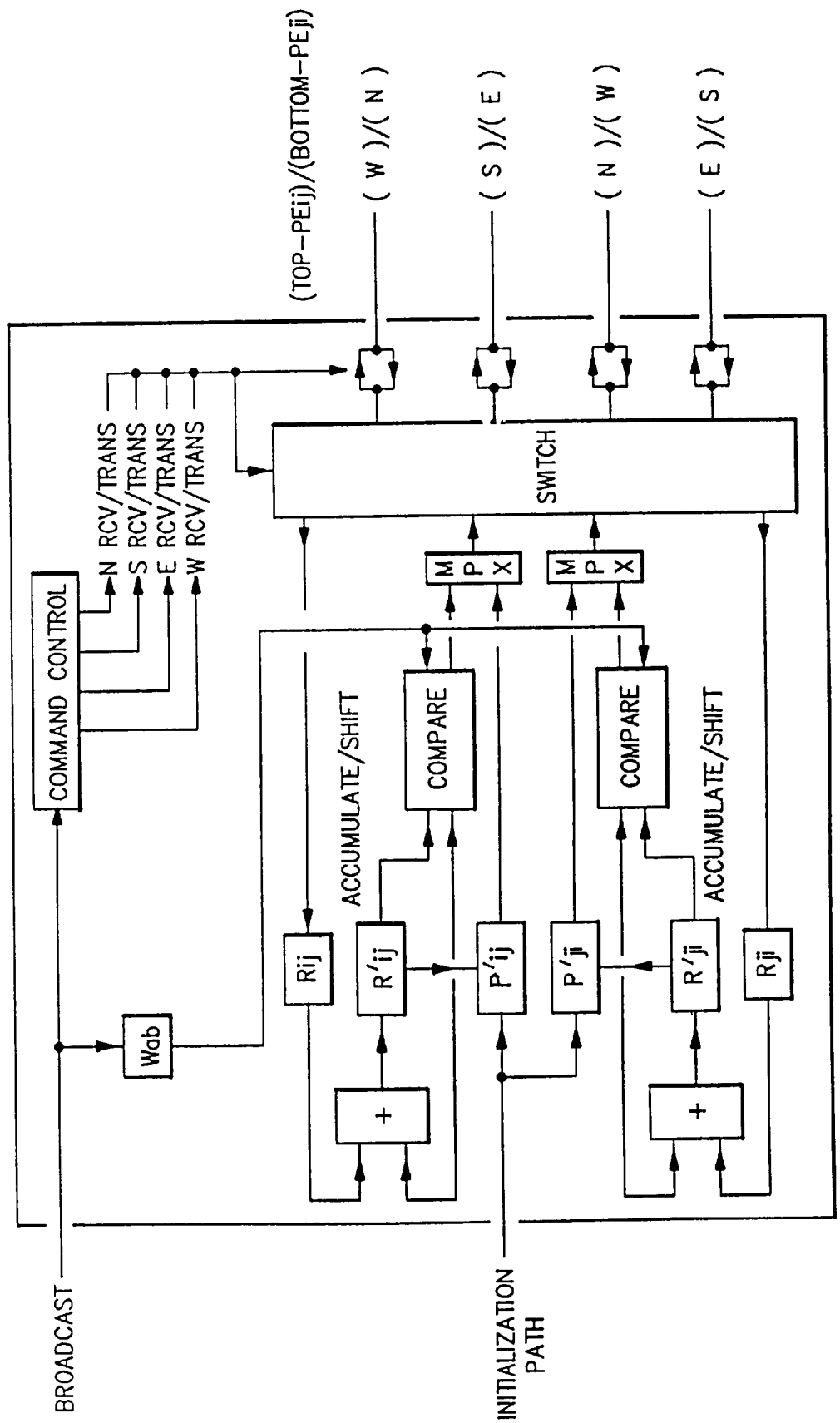

This notation is continued for continuity, though the PE internal structure, FIG. 4A, is modified for the finite difference method algorithm, with the modified PE shown in FIG. 14A. The diagonal PEs are also modified from the form shown in FIG. 4F in a similar manner to the dual PE structure. The diagonal PEs contain one execution unit and registers appropriate for a single PE, the structure is inferred from FIG. 14A. The same transmission/receiving I/O ports and controls are utilized in the new PE internal structure, but the computation functions are modified. An adder with an accumulator/shifter is utilized to provide the summation and division by 4 operations required by equation 8. The $W_{ab}$ register stores a maximum acceptable error value for use by the compare logic. After a new P(i,j) value is computed it is compared to the previous P(i,j) value and if the difference is greater than the maximum acceptable error in any PE the calculations must be continued. Since all PEs must have an error value that is less than the maximum acceptable error, the controlling system must know the state of the PEs compare operation. This can be obtained by sending a logic value from each PE through the mesh structure to the controlling system for a global analysis. FIG. 14B through 14E presents the switch and I/O port configurations for the North, South, East, and West transmission modes.

Figure 15A:
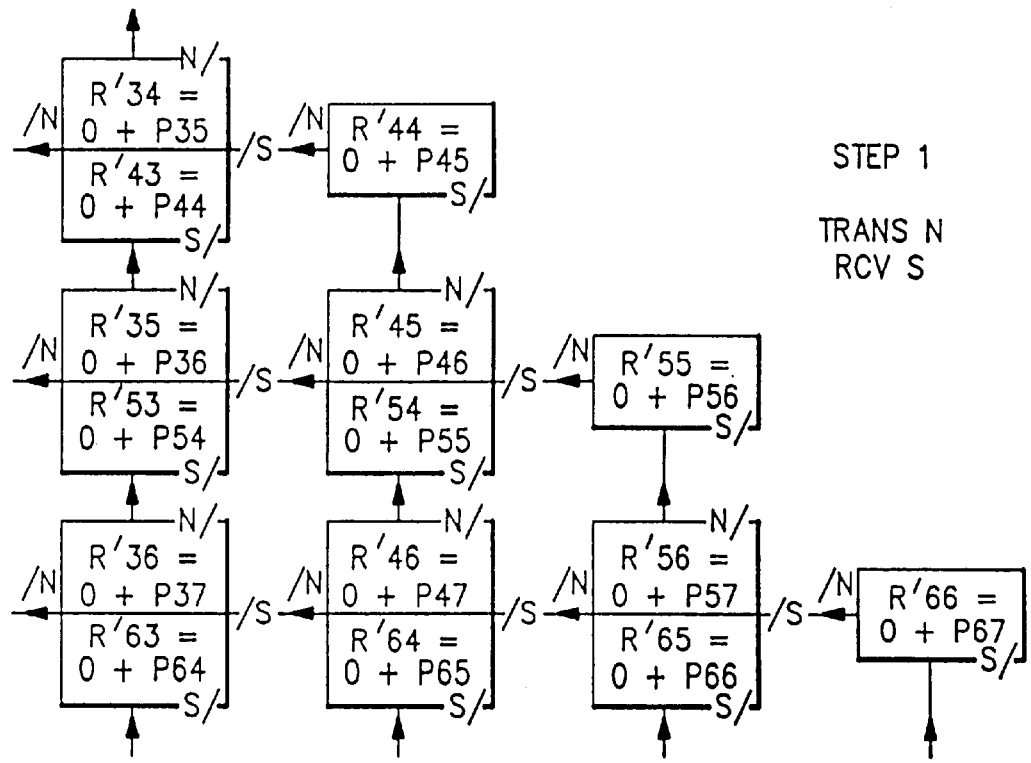
FIG. 15 shows a our finite difference method Steps 1 through 5.
Figure 15A:
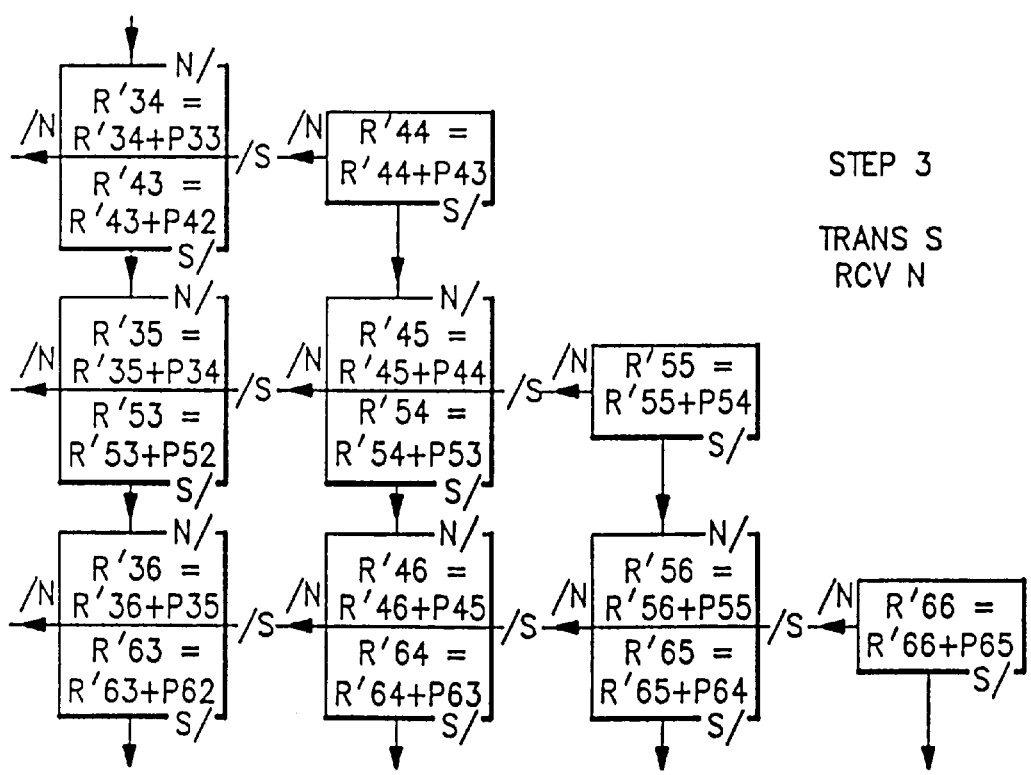
Figure 15B:
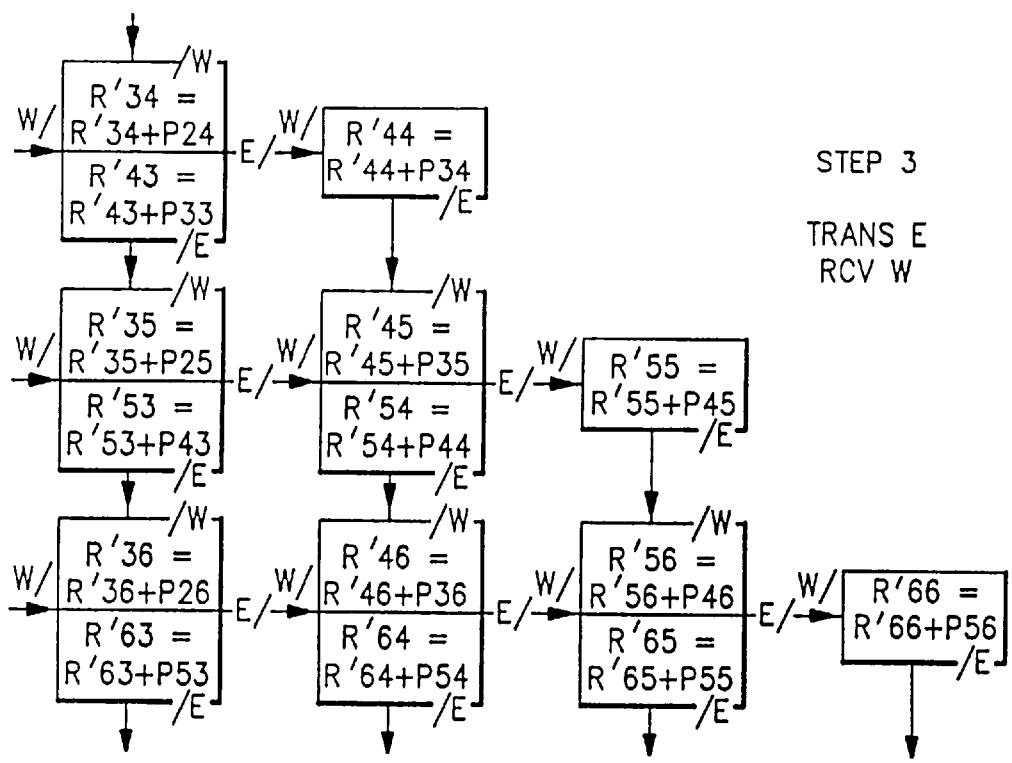
Figure 15B:
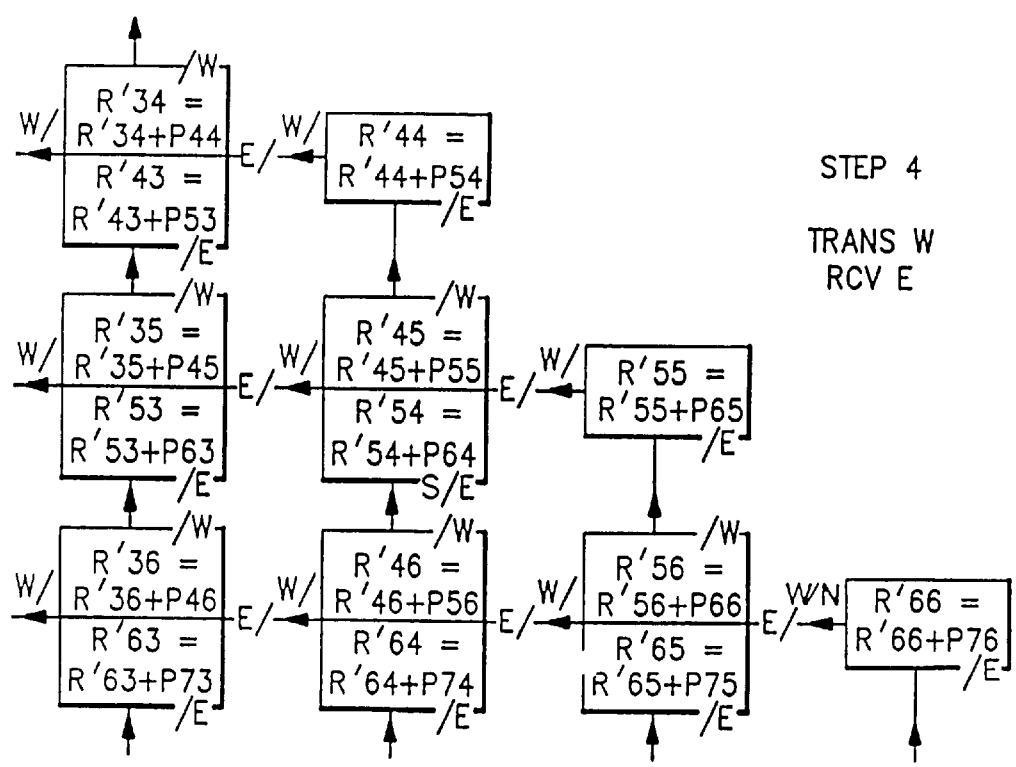
Figure 15C:
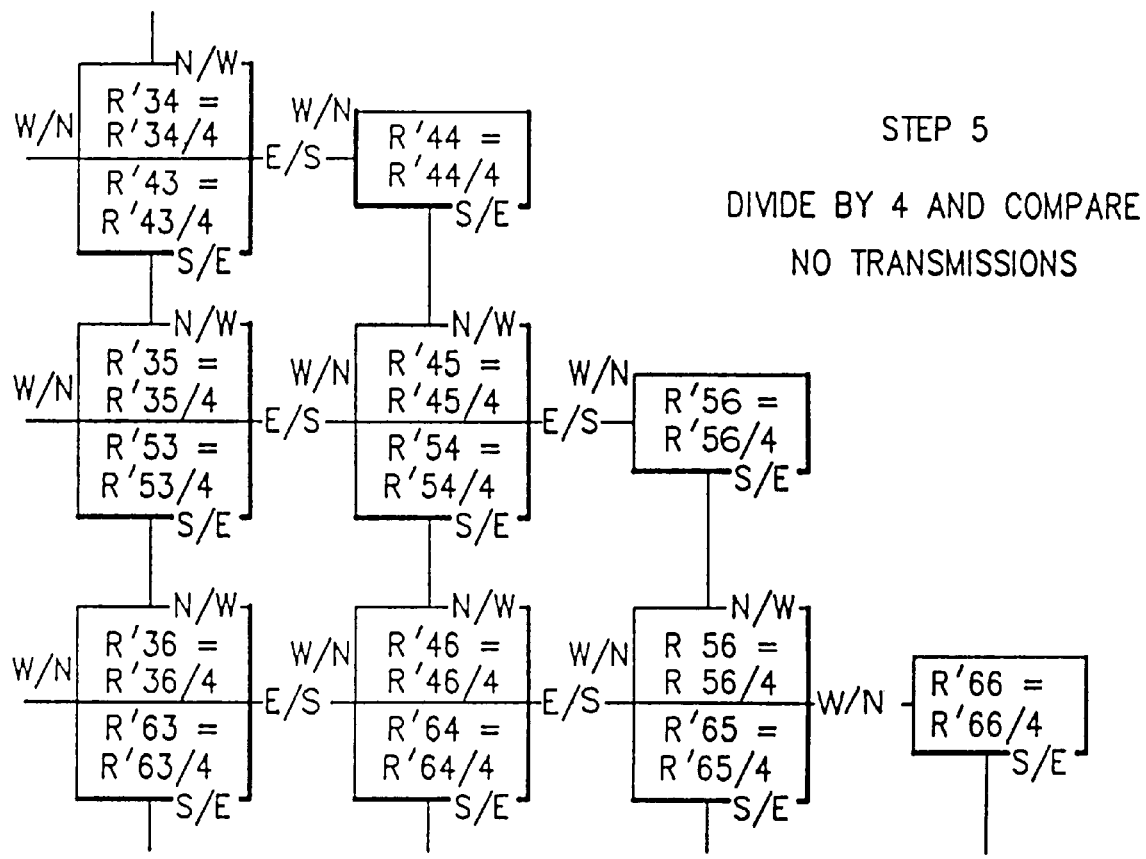
Figure 15:
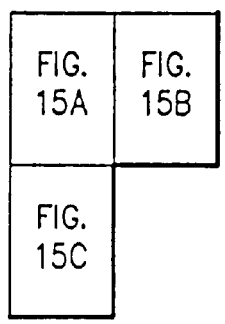

The initial values loaded into the $P_{ij}$ registers are problem dependent. The accumulators $R'_{ij}$ are initialized to zero and a maximum acceptable error value is loaded into the $W_{ab}$ register. After initialization the following steps are followed, refer to FIGS. 15 STEPS 1 through 5 corresponding to the following listed steps.

1. Step 1: Transmit North the $P_{i,j}$ values and add the received values to the $R'_{ij}$ value.

2. Step 2: Transmit East the $P_{ij}$ values and add the received values to the $R'_{ij}$ value.
3. Step 3: Transmit South the $P_{ij}$ values and add the received values to the $R'_{ij}$ value.
4. Step 4: Transmit West the $P_{ij}$ values and add the received values to the $R'_{ij}$ value.
5. Step 5: Shift the accumulated value in $R'_{ij}$ right 2 positions to accomplish the division by 4 and compare the shifted accumulated value $R'_{ij}$ with the original value $P_{ij}$ to verify whether the two values are within the maximum specified error. The result of the compare is transmitted to the edge of the array where a global determination of convergence is tested for.

If global convergence has not been reached then the above process is continued until convergence is reached globally.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A processor array comprising:
    a plurality of processing elements (PEs) arranged in a multidimensional array, the PEs each comprising a plurality of input/output (I/O) ports, each of the I/O ports for transmitting and receiving data;
    the PEs each coupled to four adjacent ones of the plurality of PES each at one of said plurality of I/O ports, and wherein each PE along an edge of the array is wraparound coupled to another PE of the plurality of PEs along a nonadjacent edge of the array, said four adjacent ones of the PEs are designated as north, south, east and west PEs;
    wherein the PEs are coupled in a folded mesh such that pairs of the PEs share said plurality of input/output ports,
    a PE designated $PE_{ij}$ shares the input/output ports with a PE designated $PE_{ji}$, where column and row subscripts i and j, respectively, are nonequal positive integers,
    PEs with i<j are designated top PEs,
    PEs with i>j are designated bottom PEs,
    PEs with i=j are designated diagonal PEs, and wherein
    the diagonal PEs are each coupled to two adjacent ones of the PEs each at one of said plurality of I/O ports, and each diagonal PE at a corner of the array is wraparound coupled to a nondiagonal PE at another corner of the array.

2. The processor array according to claim 1, wherein the PEs each further comprise means for transmitting and receiving data in:
    a) transmit east/receive west mode for transmitting data to the east PE over one of said I/O ports while receiving data form the west PE over another of the I/O ports;
    b) transmit north/receive south mode for transmitting data to the north PE over one of said I/O ports while receiving data from the south PE over a another of the I/O ports;
    c) transmit south/receive north mode for transmitting data to the south PE over one of the I/O ports while receiving data from the north PE over another of the I/O ports; and
    d) transmit west/receive east mode for transmitting data to the west PE over one of the I/O ports while receiving data from the east PE over another of the I/O ports.

3. The processor array according to claim 2 further comprising means of processing a square matrix algorithms, whereby the array is interconnected using half as many PE interconnections as a two dimensional square array.

4. The processor array according to claim 2, wherein said I/O ports each comprise a bit serial communication scheme.

* * * * *